US010868595B2

(12) United States Patent
Nam et al.

(10) Patent No.: US 10,868,595 B2
(45) Date of Patent: Dec. 15, 2020

(54) ENHANCED FEEDBACK WITH A DYNAMIC CODEBOOK

(71) Applicant: QUALCOMM Incorporated, San Diego, CA (US)

(72) Inventors: Wooseok Nam, San Diego, CA (US); Zhifei Fan, San Diego, CA (US); Tao Luo, San Diego, CA (US); Xiaoxia Zhang, San Diego, CA (US); Jing Sun, San Diego, CA (US); Arumugam Chendamarai Kannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/736,778

(22) Filed: Jan. 7, 2020

(65) Prior Publication Data
US 2020/0228174 A1 Jul. 16, 2020

Related U.S. Application Data

(60) Provisional application No. 62/791,340, filed on Jan. 11, 2019.

(51) Int. Cl.
*H04B 17/318* (2015.01)
*H04B 7/0456* (2017.01)
(Continued)

(52) U.S. Cl.
CPC ......... *H04B 7/0478* (2013.01); *H04B 7/0452* (2013.01); *H04L 1/1861* (2013.01);
(Continued)

(58) Field of Classification Search
CPC ... H04B 7/0478; H04B 7/0452; H04L 1/1893; H04L 5/005; H04L 1/1861; H04L 1/1864;
(Continued)

(56) References Cited

U.S. PATENT DOCUMENTS

2017/0134140 A1* 5/2017 Park ..................... H04L 1/0046
2018/0098345 A1* 4/2018 Tiirola ................. H04B 7/0456
(Continued)

FOREIGN PATENT DOCUMENTS

WO   WO-2018222102 A1   12/2018

OTHER PUBLICATIONS

International Search Report and Written Opinion—PCT/US2020/012686—ISAEPO—May 25, 2020.
(Continued)

*Primary Examiner* — Vineeta S Panwalkar
(74) *Attorney, Agent, or Firm* — Holland & Hart LLP

(57) ABSTRACT

Methods, systems, and devices for wireless communications are described. A size of a hybrid automatic repeat request (HARQ)-acknowledgment (ACK) codebook may be determined and indicated when the HARQ-ACK codebook is transmitted. For example, a user equipment (UE) may transmit a number of information bits within a HARQ-ACK codebook, and may further indicate a size of the HARQ-ACK codebook based on the number of information bits. The UE may transmit the indication of the size of the HARQ-ACK codebook on the same or different time/frequency resources as the HARQ-ACK codebook, using a particular field, using a different uplink channels, or the like. Additionally or alternatively, the UE may indicate the size of the HARQ-ACK codebook using a particular pattern or sequence of reference signals associated with the channel used to carry the HARQ-ACK codebook.

29 Claims, 19 Drawing Sheets

(51) Int. Cl.
*H04B 7/0452* (2017.01)
*H04L 5/00* (2006.01)
*H04W 72/04* (2009.01)
*H04L 1/18* (2006.01)

(52) U.S. Cl.
CPC ............ *H04L 1/1893* (2013.01); *H04L 5/005* (2013.01); *H04W 72/0413* (2013.01)

(58) Field of Classification Search
CPC . H04L 1/1825; H04L 1/1614; H04W 72/0413
See application file for complete search history.

(56) References Cited

U.S. PATENT DOCUMENTS

2018/0167173 A1* 6/2018 Guan .................... H04L 1/1864
2018/0242286 A1* 8/2018 Song ................... H04W 72/042
2019/0363840 A1* 11/2019 Wang ................... H04L 1/1861

OTHER PUBLICATIONS

Nokia Networks: "Dynamic HARQ-ACK Codebook Size Determination", 3GPP Draft, 3GPP TSG-RAN WG1 Meeting #82bis, R1-155581, 3rd Generation Partnership Project (3GPP), Mobile Competence Centre, 650, Route Des Lucioles, F-06921, Sophia-Antipolis Cedex, France, vol. RAN WG1, No. Malmo, Sweden, Oct. 5, 2015-Oct. 9, 2015, Oct. 4, 2015 (Oct. 4, 2015), XP051002445, 5 Pages, Retrieved from the Internet: URL: http://www.3gpp.org/ftp/Meetings_3GPP_SYNC/RAN1/Docs/, [retrieved on Oct. 4, 2015], p. 3.

* cited by examiner

ENHANCED FEEDBACK WITH A DYNAMIC CODEBOOK

CROSS REFERENCE

The present application for patent claims the benefit of U.S. Provisional Patent Application No. 62/791,340 by Nam et al., entitled "ENHANCED FEEDBACK WITH A DYNAMIC CODEBOOK," filed Jan. 11, 2019, assigned to the assignee hereof, and expressly incorporated by reference herein.

BACKGROUND

The following relates generally to wireless communications, and more specifically to enhanced feedback with a dynamic codebook.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communication systems, a UE may communicate with a base station using hybrid automatic repeat request (HARQ) feedback. For example, the system may use HARQ feedback transmissions to identify and correct for errors in transmitted data, where the feedback may include an acknowledgement (ACK) or a negative acknowledgement (NACK). In some cases, a UE may fail to detect one of multiple downlink messages transmitted by the base station, which may result in inaccurate or incomplete HARQ feedback sent by the UE, which may lead to inefficient communications in the system.

SUMMARY

The described techniques relate to improved methods, systems, devices, and apparatuses that support enhanced feedback with a dynamic codebook. Generally, the described techniques provide for the transmission of a codebook and an indication of a size of the codebook for hybrid automatic repeat request (HARQ) feedback. For example, a wireless communications system may support dynamic codebook-based HARQ feedback. In such systems, a UE may transmit, to a base station, a number of information bits within a HARQ-acknowledgment (ACK) codebook. As an example, the UE may monitor for downlink transmissions during one or more monitoring occasions, detect one or more downlink transmissions, and may indicate whether each detected downlink transmission was successfully decoded by the UE using respective information bits. When generating the HARQ-ACK codebook, the UE may determine a codebook size based on a number of the information bits included within the HARQ-ACK codebook.

The UE may transmit the HARQ-ACK codebook providing feedback to a base station for the downlink transmissions, and may also transmit an indication of the determined size of the HARQ-ACK codebook. For instance, the UE may transmit the size of the HARQ-ACK codebook using a field having a predefined size. In such cases, the HARQ-ACK codebook and the field including the size of the HARQ-ACK codebook may be transmitted on the same or different time/frequency resources, using different uplink channels, or the like. Additionally or alternatively, the UE may indicate the size of the HARQ-ACK codebook using a particular pattern or sequence of reference signals associated with the channel used to carry the HARQ-ACK codebook. Further, the size of the HARQ-ACK codebook may explicitly provide the number of information bits in the HARQ-ACK codebook, or a value representing the size of the codebook may be signaled. In any case, the indicated size of the HARQ-ACK codebook may enable a base station to efficiently identify the size of a HARQ-ACK codebook and determine whether the codebook size is the same as an expected HARQ-ACK codebook size (e.g., based on the downlink transmission(s) sent by the base station). The base station may determine whether any downlink transmissions were not detected by the UE if the HARQ-ACK codebook is different than expected, ensuring that the UE receives any downlink transmissions that were missed.

A method of wireless communication at a UE is described. The method may include determining, for one or more monitoring occasions, whether a set of downlink messages from a base station have been detected by the UE, generating, based on the determination, a HARQ-ACK codebook including an information bit for each detected downlink message of the set of downlink messages, determining a size of the HARQ-ACK codebook based on a number of information bits of the HARQ-ACK codebook, and transmitting, to the base station, the HARQ-ACK codebook and an indication of the size of the HARQ-ACK codebook.

An apparatus for wireless communication at a UE is described. The apparatus may include a processor, memory in electronic communication with the processor, and instructions stored in the memory. The instructions may be executable by the processor to cause the apparatus to determine, for one or more monitoring occasions, whether a set of downlink messages from a base station have been detected by the UE, generate, based on the determination, a HARQ-ACK codebook including an information bit for each detected downlink message of the set of downlink messages, determine a size of the HARQ-ACK codebook based on a number of information bits of the HARQ-ACK codebook, and transmit, to the base station, the HARQ-ACK codebook and an indication of the size of the HARQ-ACK codebook.

Another apparatus for wireless communication at a UE is described. The apparatus may include means for determining, for one or more monitoring occasions, whether a set of downlink messages from a base station have been detected by the UE, generating, based on the determination, a HARQ-ACK codebook including an information bit for each detected downlink message of the set of downlink messages, determining a size of the HARQ-ACK codebook based on a number of information bits of the HARQ-ACK codebook, and transmitting, to the base station, the HARQ-ACK codebook and an indication of the size of the HARQ-ACK codebook.

A non-transitory computer-readable medium storing code for wireless communication at a UE is described. The code may include instructions executable by a processor to determine, for one or more monitoring occasions, whether a set of downlink messages from a base station have been detected by the UE, generate, based on the determination, a HARQ-ACK codebook including an information bit for each detected downlink message of the set of downlink messages, determine a size of the HARQ-ACK codebook based on a number of information bits of the HARQ-ACK codebook, and transmit, to the base station, the HARQ-ACK codebook and an indication of the size of the HARQ-ACK codebook.

In some examples of the method, apparatuses, and non-transitory computer-readable medium described herein, transmitting the indication of the size of the HARQ-ACK codebook may include operations, features, means, or instructions for transmitting the indication of the size of the HARQ-ACK codebook using a field having a predetermined size. Some examples of the method, apparatuses, and non-transitory computer-readable medium described herein may further include operations, features, means, or instructions for encoding the HARQ-ACK codebook using a first channel coding process, encoding the field including the indication of the size of the HARQ-ACK codebook using a second channel coding process, and mapping the encoded HARQ-ACK codebook and the encoded field to a set of uplink resources.

In some examples of the method, apparatuses, and non-transitory computer-readable medium described herein, transmitting the indication of the size of the HARQ-ACK codebook may include operations, features, means, or instructions for signaling the number of information bits in the HARQ-ACK codebook; or signaling a value that represents the number of information bits in the HARQ-ACK codebook.

In some examples of the method, apparatuses, and non-transitory computer-readable medium described herein, transmitting the HARQ-ACK codebook and the indication of the size of the HARQ-ACK codebook may include operations, features, means, or instructions for transmitting the HARQ-ACK codebook and the indication of the size of the HARQ-ACK codebook on a same set of uplink resources.

In some examples of the method, apparatuses, and non-transitory computer-readable medium described herein, the same set of uplink resources includes a same physical uplink control channel (PUCCH) or a same physical uplink shared channel (PUSCH). In some examples of the method, apparatuses, and non-transitory computer-readable medium described herein, transmitting the HARQ-ACK codebook and the indication of the size of the HARQ-ACK codebook may include operations, features, means, or instructions for transmitting the HARQ-ACK codebook on a first set of uplink resources, and transmitting the indication of the size of the HARQ-ACK codebook on a second set of uplink resources.

Some examples of the method, apparatuses, and non-transitory computer-readable medium described herein may further include operations, features, means, or instructions for transmitting the first set of uplink resources before transmitting the second set of uplink resources. Some examples of the method, apparatuses, and non-transitory computer-readable medium described herein may further include operations, features, means, or instructions for transmitting the second set of uplink resources before transmitting the first set of uplink resources. In some examples of the method, apparatuses, and non-transitory computer-readable medium described herein, the first set of uplink resources includes a first PUCCH or a first PUSCH, and the second set of uplink resources includes a second PUCCH or a second PUSCH.

In some examples of the method, apparatuses, and non-transitory computer-readable medium described herein, transmitting the HARQ-ACK codebook and the indication of the size of the HARQ-ACK codebook may include operations, features, means, or instructions for transmitting the HARQ-ACK codebook on an uplink control channel, and transmitting the indication of the size of the HARQ-ACK codebook using a reference signal pattern associated with the uplink control channel, where the reference signal pattern may be encoded to convey the size of the HARQ-ACK codebook.

In some examples of the method, apparatuses, and non-transitory computer-readable medium described herein, the HARQ-ACK codebook includes a dynamic codebook based on a number of detected downlink messages of the set of downlink messages. In some examples of the method, apparatuses, and non-transitory computer-readable medium described herein, the set of downlink messages include a physical downlink control channel (PDCCH) having a physical downlink shared channel (PDSCH) allocation, or a PDCCH releasing a semi-persistently scheduled PDSCH, or a semi-persistent PDSCH, or a combination thereof.

A method of wireless communication at a base station is described. The method may include transmitting, to a UE, a set of downlink messages during one or more transmission occasions, receiving, from the UE, a HARQ-ACK codebook and an indication of a size of the HARQ-ACK codebook, the HARQ-ACK codebook including respective information bits for at least a subset of the set of downlink messages, determining the size of the HARQ-ACK codebook based on the indication of the size of the HARQ-ACK codebook, and decoding the HARQ-ACK codebook based on the size of the HARQ-ACK codebook.

An apparatus for wireless communication at a base station is described. The apparatus may include a processor, memory in electronic communication with the processor, and instructions stored in the memory. The instructions may be executable by the processor to cause the apparatus to transmit, to a UE, a set of downlink messages during one or more transmission occasions, receive, from the UE, a HARQ-ACK codebook and an indication of a size of the HARQ-ACK codebook, the HARQ-ACK codebook including respective information bits for at least a subset of the set of downlink messages, determine the size of the HARQ-ACK codebook based on the indication of the size of the HARQ-ACK codebook, and decode the HARQ-ACK codebook based on the size of the HARQ-ACK codebook.

Another apparatus for wireless communication at a base station is described. The apparatus may include means for transmitting, to a UE, a set of downlink messages during one or more transmission occasions, receiving, from the UE, a HARQ-ACK codebook and an indication of a size of the HARQ-ACK codebook, the HARQ-ACK codebook including respective information bits for at least a subset of the set of downlink messages, determining the size of the HARQ-ACK codebook based on the indication of the size of the HARQ-ACK codebook, and decoding the HARQ-ACK codebook based on the size of the HARQ-ACK codebook.

A non-transitory computer-readable medium storing code for wireless communication at a base station is described. The code may include instructions executable by a processor to transmit, to a UE, a set of downlink messages during one or more transmission occasions, receive, from the UE, a HARQ-ACK codebook and an indication of a size of the HARQ-ACK codebook, the HARQ-ACK codebook including respective information bits for at least a subset of the set of downlink messages, determine the size of the HARQ-ACK codebook based on the indication of the size of the HARQ-ACK codebook, and decode the HARQ-ACK codebook based on the size of the HARQ-ACK codebook.

Some examples of the method, apparatuses, and non-transitory computer-readable medium described herein may further include operations, features, means, or instructions for determining an expected size of the HARQ-ACK codebook based on the transmitted set of downlink messages, comparing the expected size of the HARQ-ACK codebook to the size of the HARQ-ACK codebook, and determining, based on the comparison, whether the UE failed to detect at least one downlink message from the set of downlink messages.

Some examples of the method, apparatuses, and non-transitory computer-readable medium described herein may further include operations, features, means, or instructions for determining that the size of the HARQ-ACK codebook may be different from the expected size of the HARQ-ACK codebook based on the comparison, and identifying the at least one downlink message the UE failed to detect based on the determination that the size of the HARQ-ACK codebook may be different from the expected size of the HARQ-ACK codebook.

In some examples of the method, apparatuses, and non-transitory computer-readable medium described herein, receiving the indication of the size of the HARQ-ACK codebook may include operations, features, means, or instructions for receiving an indication of a number of information bits in the HARQ-ACK codebook; or receiving a value that represents the number of information bits in the HARQ-ACK codebook.

In some examples of the method, apparatuses, and non-transitory computer-readable medium described herein, receiving the indication of the size of the HARQ-ACK codebook may include operations, features, means, or instructions for receiving the indication of the size of the HARQ-ACK codebook via a field having a predetermined size, the method further including decoding the field to obtain the size of the HARQ-ACK codebook.

In some examples of the method, apparatuses, and non-transitory computer-readable medium described herein, receiving the HARQ-ACK codebook and the indication of the size of the HARQ-ACK codebook may include operations, features, means, or instructions for receiving the HARQ-ACK codebook and the indication of the size of the HARQ-ACK codebook on a same set of uplink resources. In some examples of the method, apparatuses, and non-transitory computer-readable medium described herein, the same set of uplink resources includes a same PUCCH or a same PUSCH.

In some examples of the method, apparatuses, and non-transitory computer-readable medium described herein, receiving the HARQ-ACK codebook and the indication of the size of the HARQ-ACK codebook may include operations, features, means, or instructions for receiving the HARQ-ACK codebook on a first set of uplink resources, and receiving the indication of the size of the HARQ-ACK codebook on a second set of uplink resources.

Some examples of the method, apparatuses, and non-transitory computer-readable medium described herein may further include operations, features, means, or instructions for receiving the first set of uplink resources before receiving the second set of uplink resources. Some examples of the method, apparatuses, and non-transitory computer-readable medium described herein may further include operations, features, means, or instructions for receiving the first set of uplink resources after receiving the second set of uplink resources. In some examples of the method, apparatuses, and non-transitory computer-readable medium described herein, the first set of uplink resources includes a first PUCCH or a first PUSCH, and the second set of uplink resources includes a second PUCCH or a second PUSCH.

In some examples of the method, apparatuses, and non-transitory computer-readable medium described herein, receiving the HARQ-ACK codebook and the indication of the size of the HARQ-ACK codebook may include operations, features, means, or instructions for receiving the HARQ-ACK codebook on an uplink control channel, and receiving the indication of the size of the HARQ-ACK codebook via a reference signal pattern associated with the uplink control channel, where the reference signal pattern may be encoded to convey the size of the HARQ-ACK codebook.

In some examples of the method, apparatuses, and non-transitory computer-readable medium described herein, the HARQ-ACK codebook includes a dynamic codebook based on a number of detected downlink messages of the set of downlink messages. In some examples of the method, apparatuses, and non-transitory computer-readable medium described herein, the set of downlink messages include a PDCCH having a PDSCH allocation, or a PDCCH releasing a semi-persistently scheduled PDSCH, or a semi-persistent PDSCH, or a combination thereof.

DETAILED DESCRIPTION

Figure 1:
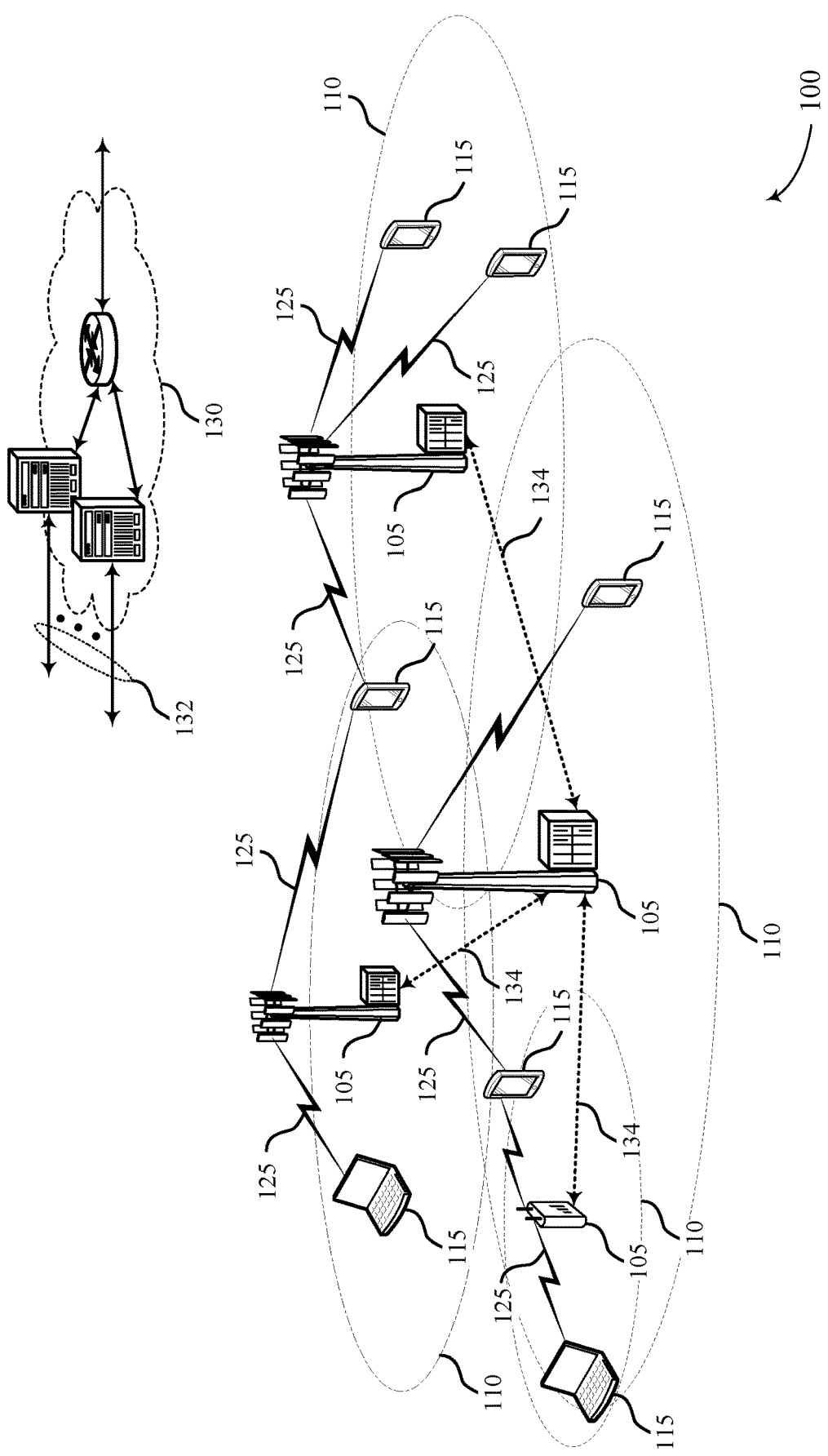
FIG. 1 illustrates an example of a system for wireless communications that supports enhanced feedback with a dynamic codebook in accordance with aspects of the present disclosure.

In some wireless communications systems, a user equipment (UE) may use hybrid automatic repeat request (HARQ) feedback to ensure reception of data transmitted within the system. For example, a UE may send HARQ feedback transmissions that include an acknowledgement (ACK) or negative acknowledgement (NACK) for data transmitted to the UE. In some cases, a flexible frame structure and dynamic indications of HARQ feedback timing may be used. As such, a time offset between reception of a downlink message (e.g., a physical downlink shared channel (PDSCH), a physical downlink control channel (PDCCH), etc.) and transmission of corresponding HARQ feedback may be variable. The system may also utilize codebook-based HARQ feedback, where multiple HARQ feedback transmissions (e.g., ACK/NACK) may be transmitted simultaneously on a single feedback occasion, and respective information bits representing detected messages may be encoded in a HARQ-ACK codebook.

In some cases, a UE may transmit different types of HARQ-ACK codebooks. For instance, a semi-static codebook may be used, where a HARQ feedback bit for a potential downlink message may be reserved in a semi-static codebook (e.g., of a fixed size, regardless of the actual transmission of the downlink message). Additionally or alternatively, a dynamic codebook may be used, where information bits may be conditionally added to the codebook based on, for example, the detection of a downlink message. Here, the UE may construct a codebook having a size that corresponds to the number of downlink transmissions detected and the corresponding information bits included in the HARQ-ACK codebook, which may reduce overhead in feedback signaling.

However, in some cases, a UE may fail to detect one of multiple downlink messages transmitted by a base station. As a result, the UE may improperly construct a codebook due to a mis-detection of a downlink message, where a dynamic codebook may be constructed with a different size (e.g., a number of bits) than a base station expects to receive. In such cases, the base station may be unable to correctly decode the UE's HARQ transmission (e.g., due to the size mismatch). Further, a system may use a downlink assignment indicator (DAI), where the DAI may assign an index to a data transmission (e.g., PDSCH) that may be bundled in a HARQ-ACK codebook. While, in some cases, the DAI may assist the UE in identifying downlink messages that may not have not been detected, the DAI may not provide full reliability for all downlink messages sent to the UE. For example, the UE may fail to detect a particular downlink message (e.g., the last PDSCH transmission in a set of PDSCH transmissions) and the UE may also be unaware of a corresponding DAI. As a result, the UE may not know to include information bits for the missing downlink transmission in the codebook, and the UE may thus generate an incorrect or incomplete codebook (e.g., a codebook of a different size than an expected codebook size due to one or more missing information bits). A base station may be unable to decode HARQ feedback bits from a UE's transmitted codebook due to the size mismatch.

As described herein, techniques may be used to notify a base station of a size of a codebook to avoid the described errors associated with codebook size mismatch. For instance, a UE may transmit a HARQ-ACK codebook and an indication of a size of the HARQ-ACK codebook. In such cases, the feedback of the codebook size may be sent using a bit field (e.g., having a fixed size), where the bit field may be channel coded separately from HARQ-ACK codebook. In other examples, the UE may transmit an indication of the size of the HARQ-ACK codebook on various uplink channels, which may be same or different as a channel used to transmit the HARQ-ACK codebook itself. Additionally or alternatively, time-staggered resources may be used to transmit the HARQ-ACK codebook and the indication of the size of the HARQ-ACK codebook (e.g., the HARQ-ACK codebook may be transmitted at a first time and the indication of the size of the HARQ-ACK codebook may be transmitted at a second, later, time). In some examples, the size of the HARQ-ACK codebook may be indicated using a pattern and/or sequence of reference signals (e.g., demodulation reference signals (DMRS)) for the channel used to transmit the HARQ-ACK codebook. In some aspects, and the size may be explicitly indicated or may be signaled as a value that represent the size of the HARQ-ACK codebook.

A base station may receive a HARQ-ACK codebook and corresponding indication of the size of the HARQ-ACK codebook and identify the codebook size. In some cases, the base station may expect a different size, and may accordingly assume that feedback for a downlink transmission sent to the UE is missing from the UE's transmitted HARQ-ACK codebook. Such an assumption may enable the base station to decode HARQ feedback bits for downlink transmissions from a UE's transmitted HARQ-ACK codebook.

Features of the subject matter described herein may be implemented to realize one or more advantages. The described techniques may generally support improvements in communications efficiency, in addition to enhancements in reliability and data throughput, among other advantages. As such, the supported techniques may include improved network operations and, in some examples, may promote network efficiencies and improve spectrum efficiency, among other benefits.

Aspects of the disclosure are initially described in the context of a wireless communications system. Further examples are then provided that illustrate techniques used to transmit an indication of a HARQ-ACK codebook size. Aspects of the disclosure are further illustrated by and described with reference to apparatus diagrams, system diagrams, and flowcharts that relate to enhanced feedback with a dynamic codebook.

FIG. 1 illustrates an example of a wireless communications system 100 that supports enhanced feedback with a dynamic codebook in accordance with aspects of the present disclosure. The wireless communications system 100 includes base stations 105, UEs 115, and a core network 130. In some examples, the wireless communications system 100 may be a Long Term Evolution (LTE) network, an LTE- Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers (CCs) operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

PDCCH carries via downlink control information (DCI) in control channel elements (CCEs), which may consist of nine logically contiguous resource element groups (REGs), where each REG contains 4 resource elements (REs). DCI includes information regarding downlink scheduling assignments, uplink resource grants, transmission scheme, uplink power control, HARQ information, a modulation and coding scheme (MCS) and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH may carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of CCE locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs served by a base station 105 and may include information such as paging information, system information, random access procedures and the like. The UE-specific search space may include user-specific control information. CCEs may be indexed, and the common search space may start from CCE 0. The starting index for a UE specific search space depends on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

A physical uplink control channel (PUCCH) may be mapped to a control channel defined by a code and two consecutive resource blocks. Uplink control signaling may depend on the presence of timing synchronization for a cell. PUCCH resources for SR and a channel quality indicator (CQI) reporting may be assigned (and revoked) through RRC signaling. In some cases, resources for SR may be assigned after acquiring synchronization through a random access channel (RACH) procedure. In other cases, an SR may not be assigned to a UE 115 through the RACH (i.e., synchronized UEs 115 may or may not have a dedicated SR channel). PUCCH resources for SR and CQI may be lost when the UE is no longer synchronized.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

Wireless communications system 100 may support transmissions dynamic HARQ-ACK codebooks along with an indication of a size of the dynamic HARQ-ACK codebook. For example, wireless communications system 100 may support codebook-based HARQ feedback (e.g., using a Type 2 HARQ-ACK codebook). As such, a UE 115 may transmit a number of information bits within a HARQ-ACK codebook to a base station 105. The UE 115 may also monitor for downlink transmissions (e.g., PDSCH, PDCCH, or both) during one or more monitoring occasions. The UE 115 may indicate, using respective information bits within the HARQ-ACK codebook, whether each detected downlink transmission was decoded successfully by the UE 115. When generating the HARQ-ACK codebook, the UE 115 may determine a codebook size based on a number of the information bits included within the HARQ-ACK codebook.

The UE 115 may transmit the HARQ-ACK codebook providing feedback regarding the downlink transmissions, and the UE 115 may also transmit an indication of the determined size of the HARQ-ACK codebook. For example, the UE 115 may transmit the size of the HARQ-ACK codebook using a predefined field. In such cases, the HARQ-ACK codebook and the field including the size of the HARQ-ACK codebook may be transmitted on the same or different time/frequency resources, using different uplink channels, or the like. In some examples, the transmission of the HARQ-ACK codebook and the indication of the codebook size may be transmitted at different times. Additionally or alternatively, the UE 115 may indicate the size of the HARQ-ACK codebook using a particular pattern or sequence of reference signals associated with the channel used to carry the HARQ-ACK codebook. In other examples, the size of the HARQ-ACK codebook may be explicitly signaled, or the UE 115 may signal a value that represents the number of information bits in the HARQ-ACK codebook. In any case, the indicated size of the HARQ-ACK codebook may enable a base station 105 to efficiently identify the size of a HARQ-ACK codebook and determine whether the codebook size is the same as an expected HARQ-ACK codebook size (e.g., based on the downlink transmission(s) sent by the base station 105).

The base station 105 may determine whether downlink transmissions were not detected by the UE 115 if the indicated size of the HARQ-ACK codebook is different than expected, ensuring that the UE 115 receives any downlink transmissions that were missed. For instance, the UE 115 may indicate a codebook size that is smaller than an expected codebook size, and the base station 105 may know that the UE 115 did not detect at least one downlink transmission and that the UE 115 is also unaware that the downlink transmission was not detected (e.g., an information bit for the missing transmission was not included in the HARQ-ACK feedback, as signaled by the size mismatch). As such, the base station 105 may ensure that the missing downlink transmission is re-transmitted to the UE 115.

Figure 2:
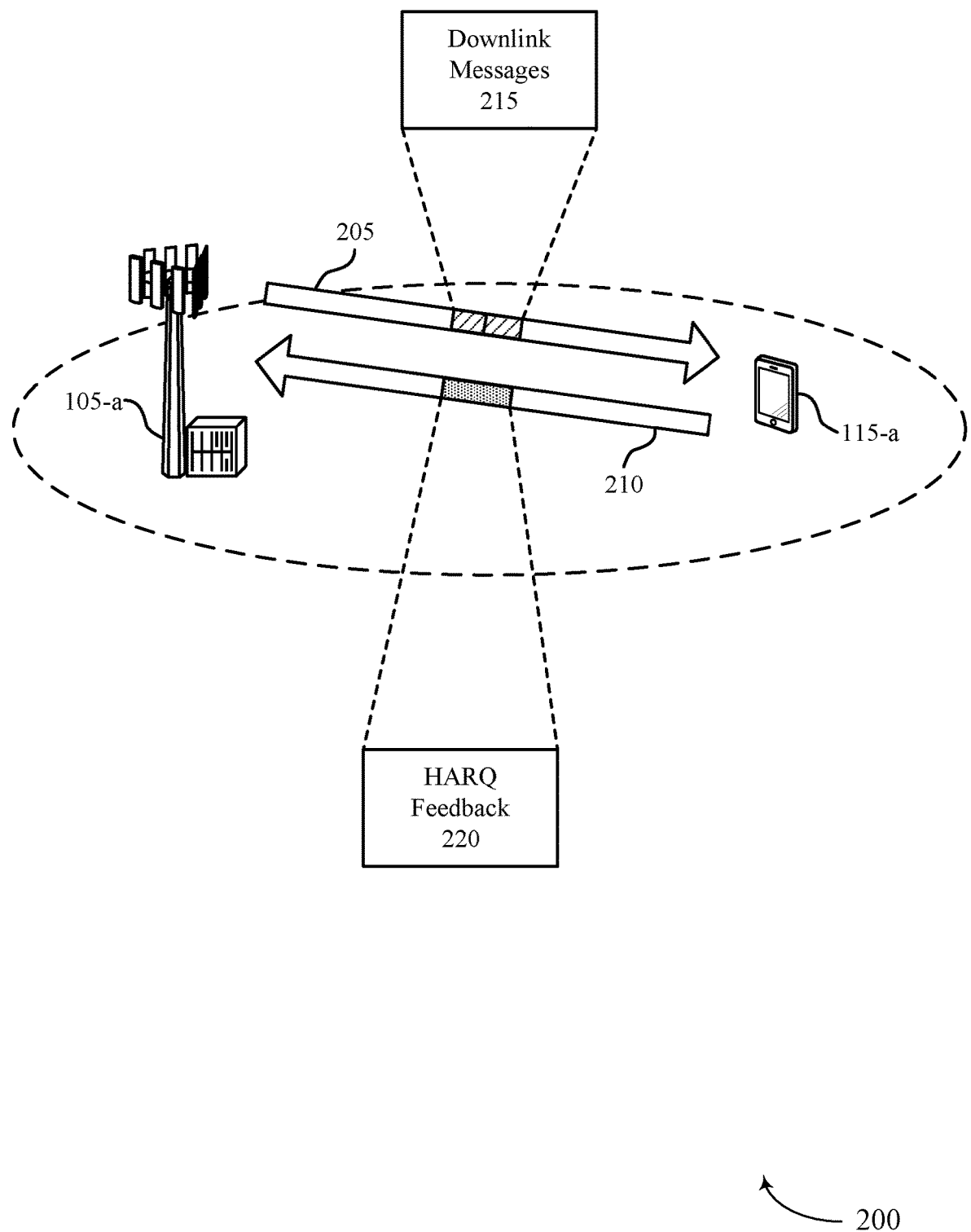
FIG. 2 illustrates an example of a wireless communications system that supports enhanced feedback with a dynamic codebook in accordance with aspects of the present disclosure.

FIG. 2 illustrates an example of a wireless communications system 200 that supports enhanced feedback with a dynamic codebook in accordance with aspects of the present disclosure. In some examples, wireless communications system 200 may implement aspects of wireless communications system 100. For example, wireless communications system 200 includes UE 115-a and base station 105-a, which may be examples of the corresponding devices described with reference to FIG. 1. Wireless communications system 200 may support the use of codebook size feedback to improve the efficiency of HARQ processes and the identification of messages that were not detected by a receiving device. As such, UE 115-a and base station 105-a may employ enhanced HARQ feedback techniques to ensure reliable and accurate feedback communication in wireless communications system 200.

In some cases, UE 115-a and base station 105-a may communicate using one or more downlink transmissions 205 and feedback transmissions 210. For example, base station 105-a may send downlink transmissions 205 on a PDSCH. UE 115-a may receive data transmitted by base station 105-a and may send feedback transmissions 210. In some cases, downlink transmissions 205 may include one or more downlink messages 215 and feedback transmissions 210 may include HARQ feedback 220 (e.g., including a dynamic HARQ-ACK codebook).

According to some aspects, UE 115-a may transmit HARQ feedback to base station 105-a. For example, base station 105-a may send data transmissions (e.g., downlink messages 215) to UE 115-a. UE 115-a may use HARQ feedback to ensure reception of the transmitted data. For example, UE 115-a may send HARQ feedback transmissions (e.g., HARQ feedback 220) that include an acknowledgement (ACK) or a negative acknowledgement (NACK) for data detected by UE 115-a. In such cases, UE 115-a may monitor for downlink messages 215 sent by base station 105-a during one or more monitoring occasions (e.g., time periods during which UE 115-a monitors a set of resources to identify data sent to UE 115-a from base station 105-a).

In some cases, wireless communications system 200 may use a flexible frame structure and a dynamic indication (e.g., indicated via DCI) of PDSCH-to-HARQ feedback timing. As such, a time offset between PDSCH reception and HARQ feedback in wireless communications system 200 may be variable. In some cases, wireless communications system 200 may use codebook-based HARQ feedback. For example, a HARQ-ACK codebook including multiple HARQ information bits (e.g., ACK/NACK for respective downlink messages 215) may be transmitted simultaneously on a single feedback occasion, where HARQ feedback bits may be encoded in a HARQ-ACK codebook.

In some cases, UE 115-a may transmit different types of HARQ-ACK codebooks. For instance, a semi-static codebook may be used, where a HARQ feedback bit may be reserved in a semi-static codebook of fixed size (e.g., regardless of whether a PDSCH transmission occurs). Additionally or alternatively, a dynamic codebook may be used. In such cases, a HARQ feedback bit may be conditionally added to a feedback transmission. For example, the HARQ feedback bit may be added or reserved in the dynamic codebook if a downlink message (such as a PDSCH transmission) is detected. Here, UE 115-a may construct a codebook for transmission based on a detection of a PDSCH transmission (e.g., where an information bit may only be included in a HARQ-ACK codebook if a transmission was detected). In some cases, UE 115-a may detect a PDSCH transmission by blind decoding of a PDCCH with a PDSCH allocation. In other cases, UE 115-a may detect a PDCCH releasing a semi-persistently scheduled PDSCH. In such cases, the PDCCH releasing the semi-persistently scheduled PDSCH may not involve the transmission of PDSCH, but UE 115-a may transmit an ACK to confirm detection of the PDCCH. In yet other cases, UE 115-a may detect a PDSCH transmission by detection of a semi-persistent PDSCH. In any event, such dynamic codebooks may reduce a codebook size and may reduce feedback overhead.

In some cases, wireless communications system 200 may use a DAI (e.g., transmitted via DCI). The DAI may assign an index to a data transmission (e.g., PDSCH) that may be bundled to a HARQ transmission containing one or more data transmissions. UE 115-a may use the DAI to identify a PDSCH transmission that UE 115-a may have failed to detect. As such, UE 115-a may use the DAI to construct a codebook. For example, UE 115-a may determine that a PDSCH transmission was not received based on a received DAI. UE 115-a may thus include a NACK for the missing PDSCH transmission in a constructed codebook.

Although, in some cases, the DAI may assist UE 115-a in identifying downlink messages that may not have not been detected, as described in further detail below, the DAI may not provide complete reliability for identifying all downlink messages 215 sent to UE 115-a. As a result, UE 115-a may not be aware of all the information bits that are to be included in a HARQ-ACK codebook. As a result, UE 115-a may construct a codebook of a different size than what base station 105-a is expecting based on the downlink transmission. Base station 105-a may be unable to decode HARQ feedback bits from a HARQ-ACK codebook transmitted by UE 115-a.

As described herein, wireless communications system 200 may implement techniques to notify base station 105-a of a size of a HARQ-ACK codebook to avoid the described errors associated with codebook size mismatch. For instance, UE 115-a may transmit a HARQ-ACK codebook along with an indication of a size of the HARQ-ACK codebook. In such cases, and as described herein, feedback of the codebook size may be sent using various techniques, and base station 105-a may use the feedback of the codebook size to efficiently identify downlink messages 215 that UE 115-a was unable to detect.

Figure 3:
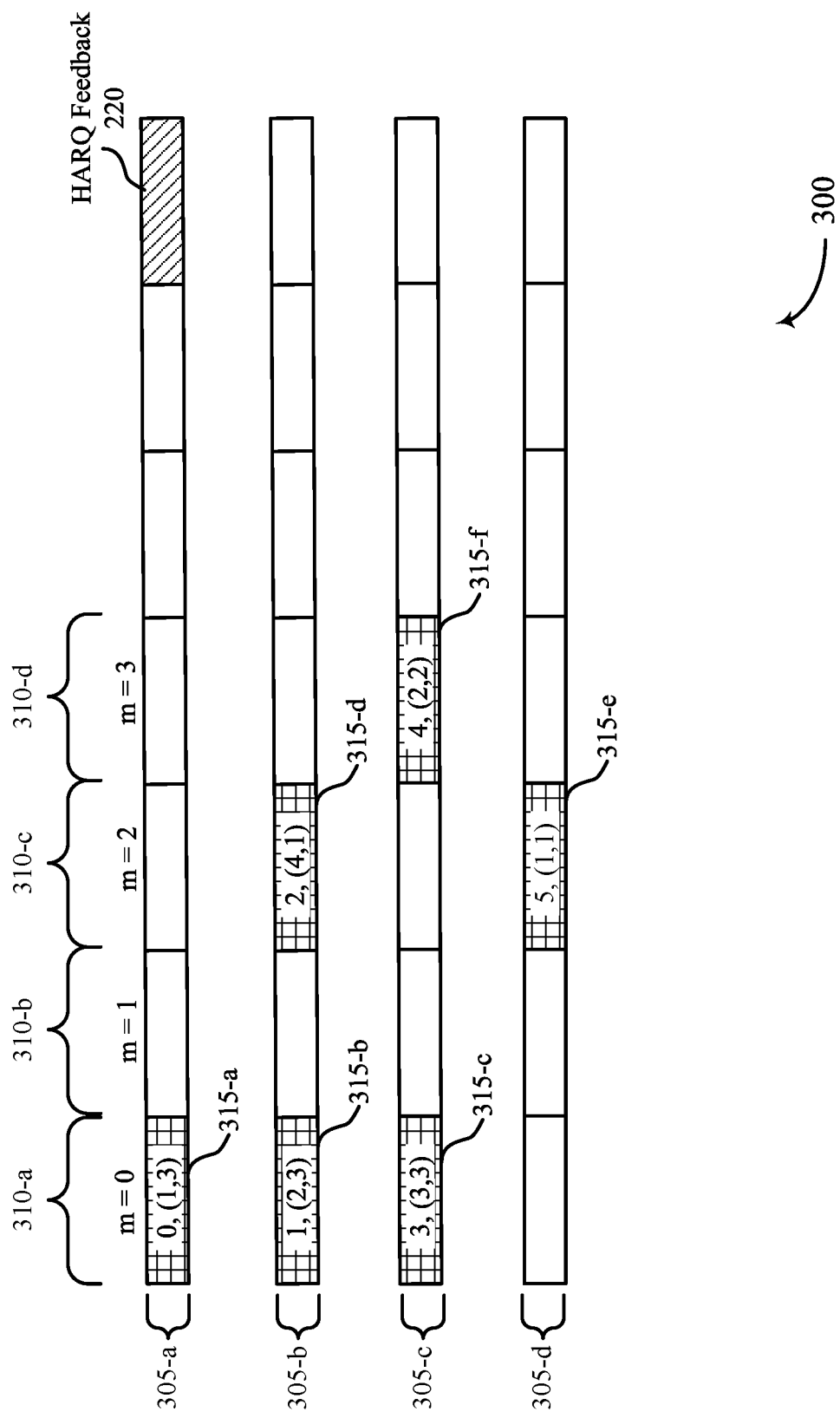
FIG. 3 illustrates an example of downlink transmission occasions and hybrid automatic repeat request (HARQ) feedback in a system that supports enhanced feedback with a dynamic codebook in accordance with aspects of the present disclosure.

FIG. 3 illustrates an example of downlink transmission occasions and HARQ feedback 300 in a system that supports enhanced feedback with a dynamic codebook in accordance with aspects of the present disclosure. In some examples, downlink transmission occasions and HARQ feedback 300 may implement aspects of wireless communications system 100. For instance, downlink transmission occasions and HARQ feedback 300 may illustrate communications between a UE 115 and a base station 105, which may be examples of a UE 115 and base station 105, respectively, described with reference to FIG. 1. Downlink transmission occasions and HARQ feedback 300 may employ enhanced HARQ feedback to ensure reliable and accurate feedback communication in the system.

In some cases, downlink transmission occasions and HARQ feedback 300 may illustrate the use of carrier aggregation with multiple (e.g., four (4)) CCs 305. For example, downlink transmissions may be sent using various CC 305 (e.g., CC 305-a, CC 305-b, through CC 305-d). Additionally, it may be assumed that there may be no code-block group (CBG)-based HARQ feedback, with a maximum of one transport block (TB) per PDSCH transmission, however other configurations not explicitly described herein are also considered.

Downlink transmission occasions and HARQ feedback 300 may also include multiple monitoring occasions in the time domain, which may each correspond to a monitoring index 310. For example, the monitoring indices 310 may be associated with an index value, m, where monitoring index 310-a may correspond to an index value m=0, monitoring index 310-b may correspond to an index value m=1, and so forth. A UE 115 may determine whether messages from the base station 105 have been detected on any monitoring index 310. For example, the UE 115 may attempt to detect valid PDSCH occasions 315 corresponding to monitoring indices 310 and CCs 305. For example, the UE 115 may detect PDSCH occasion 315-a corresponding to monitoring index 310-a and CC 305-a.

In some cases, a system may use a DAI transmitted via DCI, where the DAI may include a counter indicator and a total indicator. The DAI may assign a counter indicator to each data transmission (e.g., PDSCH) in a group of data transmissions. The DAI may also assign a total indicator to each group of data transmissions in a monitoring index. For example, for first monitoring index 310-a, PDSCH occasions 315-a, 315-b, and 315-c may be assigned a total indicator of 3. A total indicator of 3 may indicate that there are 3 total transmissions in monitoring index 310-a. Additionally, each PDSCH occasion 315 sharing a total indicator may also be assigned a counter indicator. For example, PDSCH occasion 315-a may be assigned a counter indicator of 1. Such a counter indicator may indicate that PDSCH occasion 315-a is a specific transmission in a group of transmissions (e.g., PDSCH occasion 315-a is a first transmission, PDSCH occasion 315-b is a second transmission, and PDSCH occasion 315-c is a last PDSCH transmission in monitoring index 310-a). In some cases, the DAI may be represented in FIG. 3 as (counter indicator, total indicator). For example, PDSCH occasion 315-a may be assigned a DAI of (1,3).

In some cases, a PDSCH occasion 315 may be allocated a HARQ feedback bit in a codebook. As shown below, each HARQ feedback bit associated with PDSCH occasions 315 may be denoted by a value. Such values may be used to illustrate the order of HARQ feedback bits in a HARQ-ACK codebook. For example, PDSCH occasion 315-a may be allocated a HARQ feedback bit to be included in a codebook. The HARQ feedback bit associated with PDSCH occasion 315-a may be denoted by a value of 0. Similarly, the HARQ feedback bit associated with PDSCH occasion 315-b may be denoted by a value of 1, and so forth.

In some cases, the base station 105 may transmit multiple PDSCH occasions 315 to the UE 115. In such cases, the UE 115 may detect multiple PDSCH occasions 315 and may construct a dynamic codebook to provide HARQ feedback. In some cases, the UE 115 may successfully detect every PDSCH occasion 315. In such cases, the UE 115 may identify a HARQ feedback bit associated with each PDSCH occasion 315. The HARQ feedback bit of each PDSCH occasion 315 may be denoted by, for example, a value from 0-5 (as illustrated). The UE 115 may use these HARQ feedback bits and construct a codebook shown in Table 1.

TABLE 1

| UE Codebook | | | | | |
|---|---|---|---|---|---|
| 0 | 1 | 3 | 2 | 5 | 4 |

In some cases, the UE 115 may successfully construct a HARQ-ACK codebook that a base station 105 may use to receive and decode HARQ feedback bits. For example, the base station 105 may send PDSCH transmissions and expect a HARQ-ACK codebook with information bits corresponding to each PDSCH that was transmitted. The base station 105 may expect to receive a codebook from the UE 115 as shown in Table 2.

TABLE 2

| Base Station Expected Codebook | | | | | |
|---|---|---|---|---|---|
| 0 | 1 | 3 | 2 | 5 | 4 |

In cases where the HARQ-ACK codebook transmitted by the UE 115 matches the expected HARQ-ACK codebook, there may be no mismatch between the base station 105 and UE 115. However, in some cases, the UE 115 may fail to detect one of multiple PDSCHs transmitted by a base station. As a result, the UE 115 may construct a codebook with missing information bits due to a mis-detection of a PDSCH, where the codebook may be constructed with different size (e.g., a number of bits) than the base station expects to receive. In such cases, the base station 105 may be unable to decode HARQ Feedback from the UE 115 (e.g., due to the size mismatch).

In some cases, the UE 115 may use the DAI to identify a PDSCH transmission that the UE 115 may have failed to detect. As such, the UE 115 may use the DAI to construct a HARQ-ACK codebook. For example, the UE 115 may determine that PDSCH occasion 315-c was not received based on a received DAI. The UE 115 may thus include a NACK for the missing PDSCH transmission in a constructed codebook. In such examples, the UE 115 may construct the example HARQ-ACK codebook shown in Table 1.

While, in some cases, the DAI may assist the UE 115 in identifying downlink messages that may not have not been detected, there may be instances where the DAI may not assist the UE 115 in identifying all PDSCH occasions 315. For example, the UE 115 may fail to detect the last PDSCH transmission (e.g., PDSCH occasion 315-f) in a set of PDSCH transmissions and the UE 115 may also miss a corresponding DAI. As a result, the UE 115 may not be aware of the missed downlink message sent during PDSCH occasion 315-f. Further, UE 115 may therefore not include information bits (e.g., HARQ feedback bits) that should be included in a HARQ-ACK codebook, and the UE 115 may thus construct an incomplete HARQ-ACK codebook.

For example, the UE 115 may construct a codebook of a different size than an expected codebook size (e.g., the codebook of Table 2) as shown in Table 3, the UE 115 may transmit the incorrect codebook in HARQ Feedback 220. The base station 105 may be unable to decode HARQ feedback bits from HARQ Feedback 220 (e.g., due to the mismatch in size of UE codebook and the expected codebook).

TABLE 3

| UE Codebook | | | | |
|---|---|---|---|---|
| 0 | 1 | 3 | 2 | 5 |

However, though the use of an indication of a size of the HARQ-ACK codebook, a base station may identify the mismatch between the codebook the UE 115 sends and the expected codebook. For instance, the base station 105 may receive a codebook and an indication of the codebook size. The base station 105 may accordingly obtain, from the codebook size, the codebook size (e.g., size N), where the base station 105 may expect a different size (e.g., size M). In such cases, the base station 105 may assume that a last PDSCH transmission (e.g., sent during PDSCH occasion 315-f) may be missing from the UE's transmitted codebook. As such, the base station 105 may know that the UE 115 did not detect at least one downlink transmission. In addition, the base station 105 may know that the UE 115 is also unaware that the downlink transmission was not detected (e.g., the information bit for the missing transmission was not included in the HARQ-ACK feedback, as signaled by the size mismatch).

Figure 4:
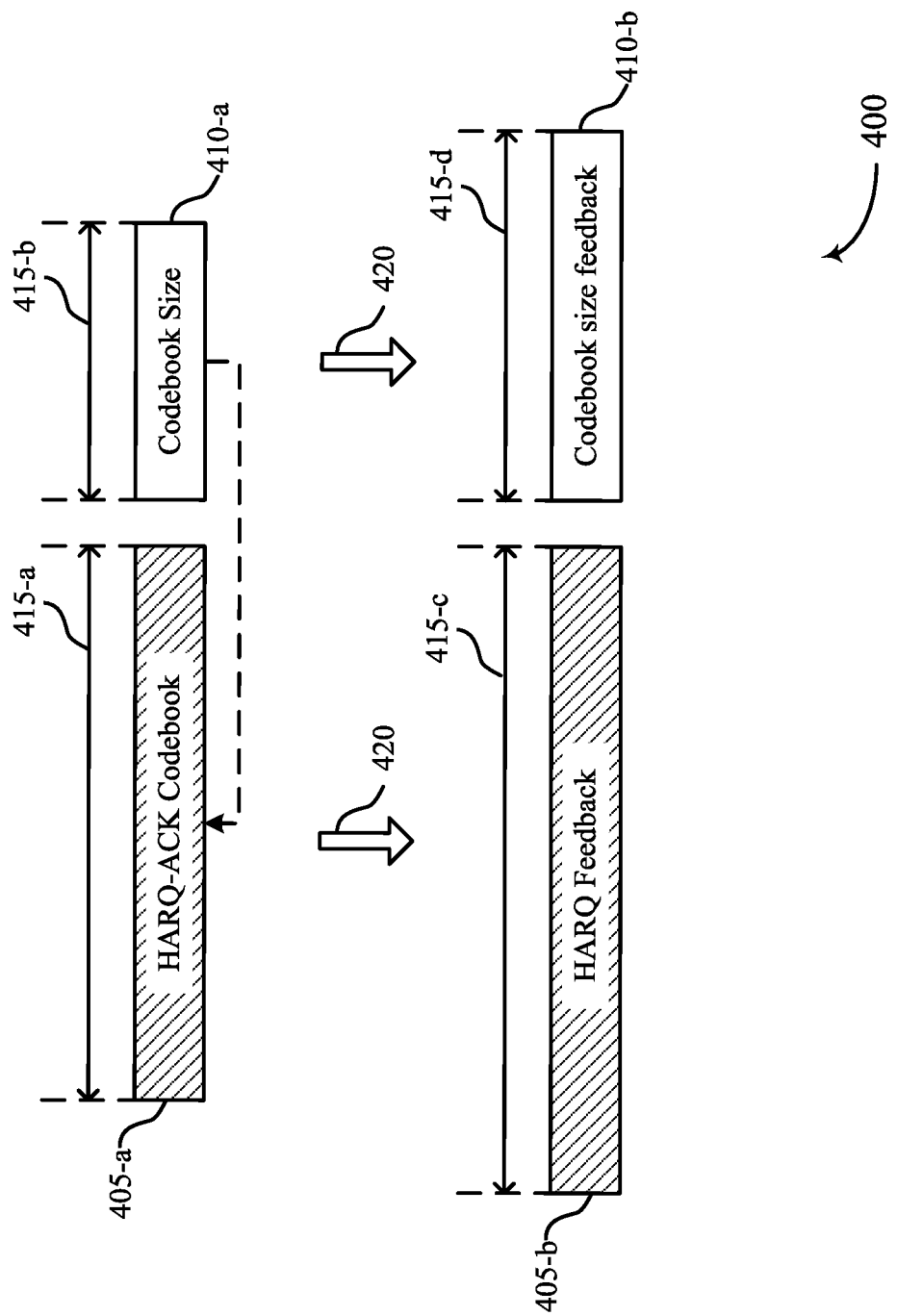
FIG. 4 illustrates an example of HARQ feedback mapping in a system that supports enhanced feedback with a dynamic codebook in accordance with aspects of the present disclosure.

FIG. 4 illustrates an example of HARQ feedback mapping 400 in a system that supports enhanced feedback with a dynamic codebook in accordance with aspects of the present disclosure. In some examples, HARQ feedback mapping 400 may implement aspects of wireless communications system 100. In some examples, HARQ feedback mapping 400 may illustrate communications between a UE 115 and a base station 105, which may be a examples of a UE 115 and base station 105, respectively, described with reference to FIG. 1. HARQ feedback mapping 400 may illustrate various schemes for transmitting an indication of a size of a HARQ-ACK codebook.

As described herein, techniques may be used to notify the base station 105 of a size of a codebook to avoid the described errors associated with codebook size mismatch. For instance, the UE 115 may transmit a HARQ-ACK codebook 405-a along with an indication of a size of the HARQ-ACK codebook (e.g., codebook size 410-a). In such cases, the feedback of the codebook size may be sent using a bit field with a fixed size, which may enable a base station to avoid a size mismatch issue associated with the HARQ-ACK codebook. For example, the field including the codebook size may be a fixed size 415-b (e.g., a fixed number of bits) and the HARQ codebook may be a variable size 415-a. The UE 115 may perform channel coding 420 on HARQ-ACK codebook 405-a. Such channel coding 420 may result in HARQ feedback 405-b. In some cases, HARQ feedback 405-b may have a fixed size 415-c. Additionally or alternatively, the UE 115 may also perform channel coding 420 on codebook size 410-a. Such channel coding 420 may result in codebook size feedback 410-b. Codebook size feedback 410-b may have a fixed size 415-d. In some cases, fixed size 415-d may be the same as fixed size 415-b. In other cases, fixed size 415-d may be different than fixed size 415-b. In some cases, a field including codebook size 410-b may be channel coded separately from the HARQ-ACK codebook 405-a.

In some cases, codebook size feedback 410-b may be an explicit value indicating the number of information bits of the codebook size 410-a. For example, codebook size feedback 410-b may indicate a value such that the base station 105 may decode the actual size (e.g., 5 bits) of the HARQ-ACK codebook 405-a. In other cases, codebook size feedback 410-b may indicate a value that represents the size of the HARQ-ACK codebook 405-a. The value may include, for example, an even or odd indication of the size of the HARQ-ACK codebook 405-a. As an illustrative example, the base station 105 may expect an even indication, for example, because an expected codebook size is based on an even number of information bits (e.g., 6 bits). In cases where the UE 115 misses the last downlink message in a set of downlink messages, the size of a constructed HARQ-ACK codebook 405-a may be based on an even number of information bits (e.g., 5 bits). Accordingly, the UE 115 may provide an indication that the HARQ-ACK codebook size is odd. Such indications may enable the base station 105 to determine that the UE-constructed codebook is a different size than an expected codebook size. Additionally or alternatively, codebook size feedback may be any value (e.g., a modulo-M value) decodable by the base station 105 to detect a missing transmission from a UE constructed codebook. Other techniques to provide a value that is representative of the size of the HARQ-ACK codebook 405-a not explicitly mentioned herein are also considered.

In some cases, the UE 115 may transmit feedback on various uplink resources. For example, the UE 115 may transmit a feedback transmission (e.g., HARQ feedback 405-b) or a codebook size bit field (e.g., codebook size feedback 410-b) on an uplink channel (e.g., PUCCH or a physical uplink shared channel (PUSCH)). In some cases, the UE 115 may transmit a HARQ codebook and codebook size 410-a on the same uplink channel. In other cases, the UE 115 may transmit a HARQ codebook on a channel and a codebook size on a different channel. For example, the UE 115 may transmit a HARQ codebook on a PUCCH and a codebook size on a PUSCH, or vice versa.

In some cases, the UE 115 may encode codebook size 410-a in a DMRS pattern and/or sequence. For example, the UE 115 may not assign separate uplink resource for codebook size feedback. Instead, the UE 115 may encode codebook size information in a DMRS pattern or sequence for an uplink channel. For example, the UE 115 may encode codebook size information in a DMRS pattern for a PUCCH or a PUSCH.

Figure 5:
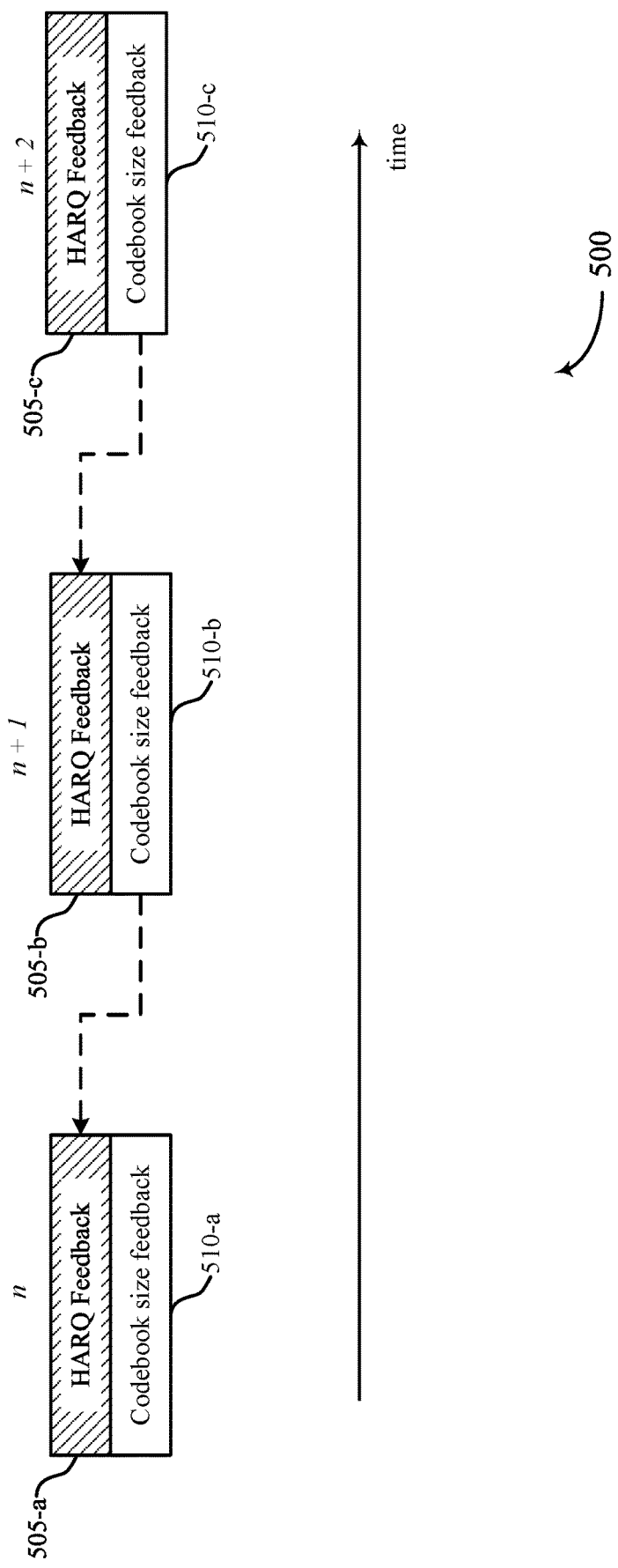
FIG. 5 illustrates an example of HARQ feedback mapping in a system that supports enhanced feedback with a dynamic codebook in accordance with aspects of the present disclosure.

FIG. 5 illustrates an example of a HARQ feedback mapping 500 that supports enhanced feedback with a dynamic codebook in accordance with aspects of the present disclosure. In some examples, HARQ feedback mapping 500 may implement aspects of wireless communications system 100. In some examples, HARQ feedback mapping 500 may illustrate communications between a UE 115 and a base station 105, which may be a examples of a UE 115 and base station 105, respectively, described with reference to FIG. 1. HARQ feedback mapping 500 may employ various techniques for the signaling of a HARQ-ACK codebook and an indication of a size of the HARQ-ACK codebook.

In some cases, a system may use time staggered resource mapping to transmit HARQ feedback, where a UE 115 may transmit HARQ feedback 505 (e.g., a dynamic HARQ codebook) at various times, where an indication of the size of the HARQ-ACK codebook may be sent at a different time. For instance, the UE 115 may transmit HARQ feedback 505-a at a first time (e.g., a time n) and transmit HARQ feedback 505-b at a second time (e.g., a time n+k). In some cases, the UE 115 may also transmit codebook size feedback 510. For example, the UE 115 may transmit a codebook size feedback 510-b at a second time n+k (e.g., when k=1). In some cases, codebook size feedback 510-b may correspond to the size of the HARQ codebook in HARQ feedback 505-b. That is, in some instances, a HARQ codebook may be transmitted at the same time as the corresponding codebook size. In other cases, a system may use time staggered resource mapping such that a codebook size corresponding to a HARQ codebook is sent at a different time than the HARQ codebook. For example, codebook size feedback 510-b may correspond to a size of the HARQ codebook in HARQ feedback 505-a. HARQ feedback 505-a may be sent at a first time n and codebook size feedback 510-b may be sent at a second time n+k.

In some cases, the base station 105 may decode a codebook size feedback 510 at the same time as decoding HARQ feedback 505 (e.g., when both transmissions are sent at the same time). In other cases, the base station 105 may decode a codebook size feedback 510 at a different time than decoding HARQ feedback 505 (e.g., when a system is using time-staggered resource mapping). For example, the base station 105 may decode a codebook size transmission sent at a second time n+k (e.g., codebook size feedback 510-b) when an expected codebook size mismatch occurs from a previous transmission (e.g., a HARQ codebook in HARQ feedback 505-a) sent at a first time n. In such cases, the base station 105 may buffer the HARQ feedback 505-a until the size of the HARQ feedback 505-a is determined. Such a decoding scheme may enable the base station 105 to perform decoding when an error (e.g., size mismatch) occurs, which may decrease processing overhead of the base station 105.

Figure 6:
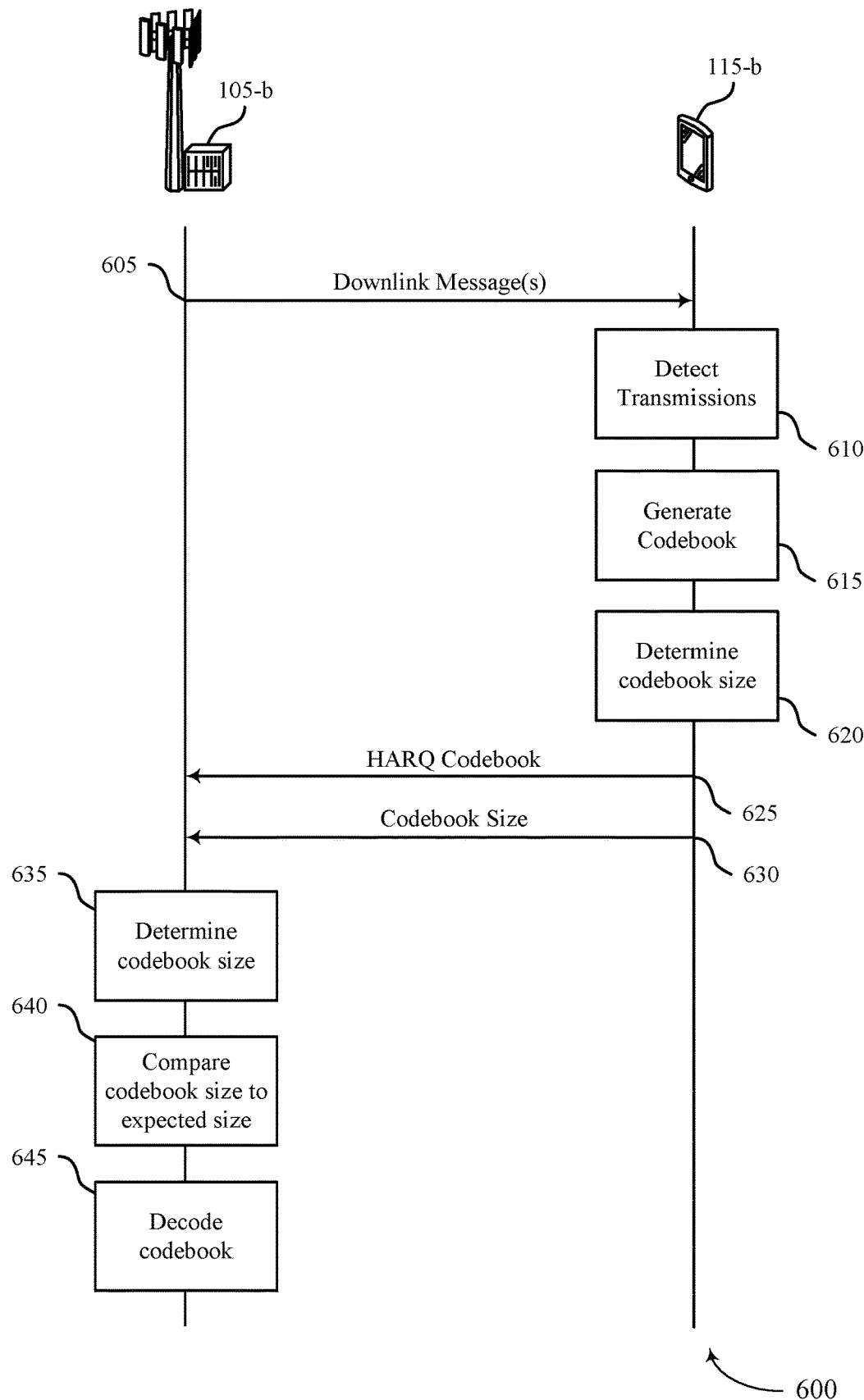
FIG. 6 illustrates an example of a process flow in a system that supports enhanced feedback with a dynamic codebook in accordance with aspects of the present disclosure.

FIG. 6 illustrates an example of a process flow 600 in a system that supports enhanced feedback with a dynamic codebook in accordance with aspects of the present disclosure. In some examples, process flow 600 may implement aspects of wireless communications system 100. For example, process flow 600 includes UE 115-*b* and base station 105-*b*, which may be examples of the corresponding devices described with reference to FIG. 1. Process flow 600 may illustrate the use of an indication of a size of a dynamic HARQ-ACK codebook for enhanced HARQ processes.

At 605, base station 105-*b* may transmit, to UE 115-*b*, a set of downlink messages. In some cases, the downlink messages may include a PDCCH with a PDSCH allocation, or a PDCCH releasing a semi-persistently-scheduled PDSCH, or a semi-persistent PDSCH, or any combination thereof. Further, the set of downlink message may be transmitted during a one or more transmitting times that may correspond to monitoring occasions used by UE 115-*b* to search for the downlink messages.

At 610, UE 115-*b* may attempt to detect the transmissions of the set of downlink messages. In some cases, UE 115-*a* may detect each PDSCH transmission by monitoring one or more monitoring occasions (e.g., as described with reference to FIG. 3). In some examples, UE 115-*b* may determine whether the set of downlink messages were detected. For instance, UE 115-*b* may detect each of the set of downlink messages. Alternatively, UE 115-*b* may be unable to detect at least one of the downlink messages sent by base station 105-*b*. Further, UE 115-*b* may not be aware that the at least one downlink message not detected was sent, which may lead UE 115-*b* to exclude a corresponding information bit from a HARQ feedback message.

At 615, UE 115-*a* may generate, based on the determination, a HARQ-ACK codebook including an information bit for each detected downlink message of the set of downlink messages. In some cases, the HARQ-ACK codebook may be a dynamic codebook with a size that is based on a number of information bits included in the codebook. At 620, UE 115-*a* may determine the size of the generated codebook based on the quantity of information bits to be transmitted to base station 105-*b* within the HARQ-ACK codebook.

At 625, UE 115-*a* may transmit, to base station 105-*b*, the generated HARQ-ACK codebook. In some cases, the HARQ-ACK codebook may be channel coded to a fixed size (e.g., using a first channel coding process). In some cases, HARQ feedback may be transmitted over uplink resources (e.g., PUCCH, PUSCH, etc.).

At 630, UE 115-*a* may transmit, to base station 105-*b*, an indication of the size of the HARQ-ACK codebook. In some examples, the indication of the codebook size may be included in a field that is channel coded separately (e.g., using a second channel coding process) from the HARQ-ACK codebook. Additionally or alternatively, the indication of the HARQ-ACK codebook size may be encoded in a DMRS pattern or sequence that is associated with an uplink channel used to transmit the HARQ-ACK feedback. In some cases, the indication of the codebook size may be transmitted over uplink resources (e.g., PUCCH, PUSCH, etc.) that may be the same or different from the resources used to transmit the HARQ-ACK codebook. Additionally or alternatively, the codebook size feedback may be sent at the same time as HARQ feedback or may follow a time-staggered resource mapping.

At 635, base station 105-*b* may determine the size of the constructed codebook based on the indication of the size of the HARQ-ACK codebook. In some cases, base station 105-*b* may determine an expected size of the HARQ-ACK codebook based on the transmitted set of downlink messages. Thus, at 640, base station 105-*b* may compare the codebook size to the expected codebook size. In some cases, a codebook size may match an expected codebook size. In other cases, a codebook size may be mismatched to an expected codebook size. Base station 105-*b* may accordingly determine, based on the comparison, whether UE 115-*b* failed to detect at least one downlink message from the set of downlink messages. If any downlink messages were not indicated in the HARQ-ACK codebook, base station 105-*b* may retransmit those messages due to the size difference indicating the at least one missed downlink message.

At 645, base station 105-*b* may decode the codebook received from the HARQ feedback transmission. Base station 105-*b* may decode the codebook based on determining if a mismatch has occurred or not. For example, if there is a size mismatch between the codebook size and the expected codebook size, base station 105-*b* may assume UE 115-*b* did not detect a last PDSCH transmission in the time domain.

Figure 7:
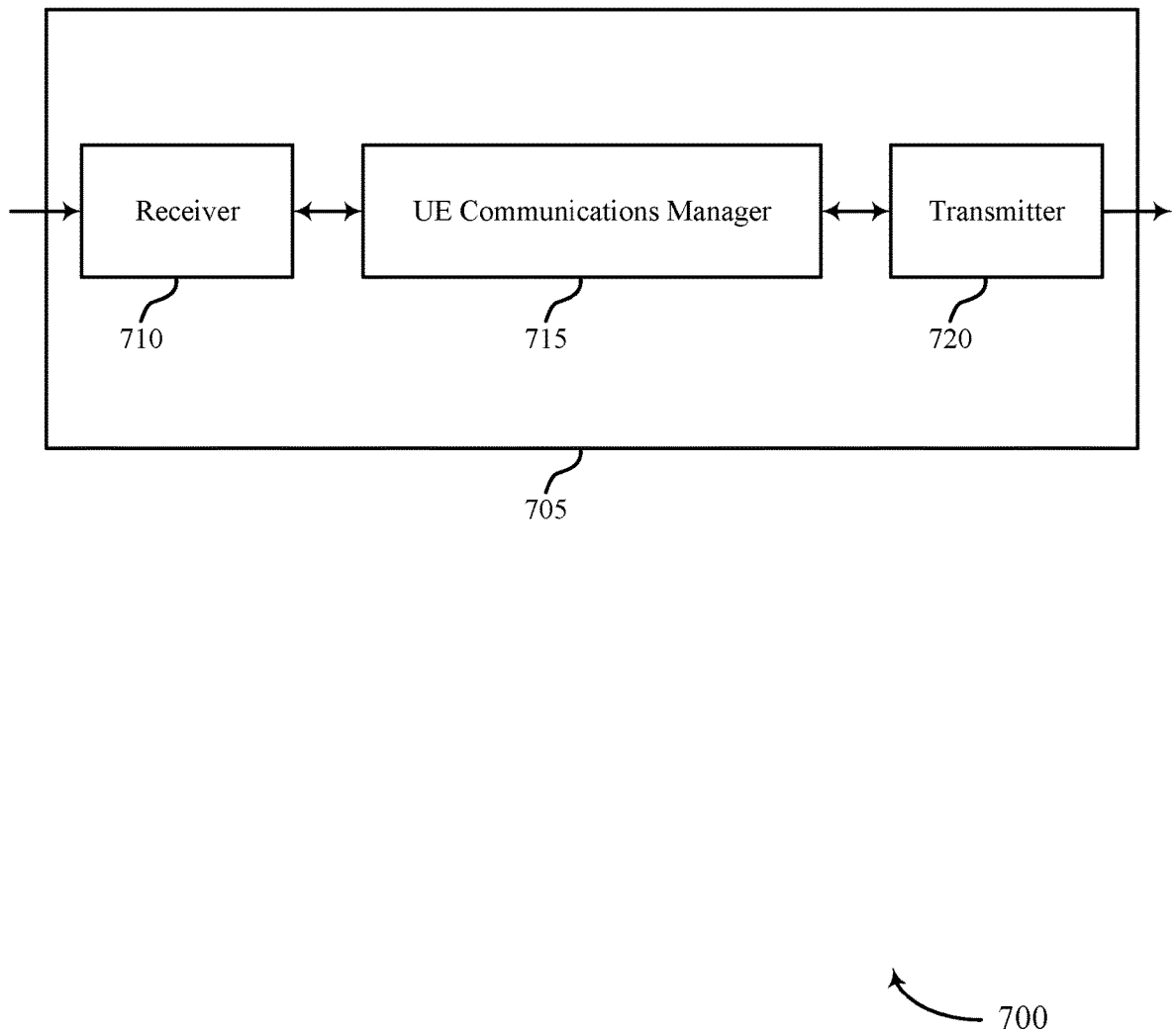
FIGS. 7 and 8 show block diagrams of devices that support enhanced feedback with a dynamic codebook in accordance with aspects of the present disclosure.

FIG. 7 shows a block diagram 700 of a device 705 that supports enhanced feedback with a dynamic codebook in accordance with aspects of the present disclosure. The device 705 may be an example of aspects of a UE 115 as described herein. The device 705 may include a receiver 710, a UE communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to enhanced feedback with a dynamic codebook, etc.). Information may be passed on to other components of the device 705. The receiver 710 may be an example of aspects of the transceiver 1020 described with reference to FIG. 10. The receiver 710 may utilize a single antenna or a set of antennas.

The UE communications manager 715 may determine, for one or more monitoring occasions, whether a set of downlink messages from a base station 105 have been detected by the UE, generate, based on the determination, a HARQ-ACK codebook including an information bit for each detected downlink message of the set of downlink messages, determine a size of the HARQ-ACK codebook based on a number of information bits of the HARQ-ACK codebook, and transmit, to the base station 105, the HARQ-ACK codebook and an indication of the size of the HARQ-ACK codebook. The UE communications manager 715 may be an example of aspects of the UE communications manager 1010 described herein.

The UE communications manager 715, or its sub-components, may be implemented in hardware, code (e.g., software or firmware) executed by a processor, or any combination thereof. If implemented in code executed by a processor, the functions of the UE communications manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE communications manager 715, or its sub-components, may be physically located at various positions, including being distributed such that portions of functions are implemented at different physical locations by one or more physical components. In some examples, the UE communications manager 715, or its sub-components, may be a separate and distinct component in accordance with various aspects of the present disclosure. In some examples, the UE communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
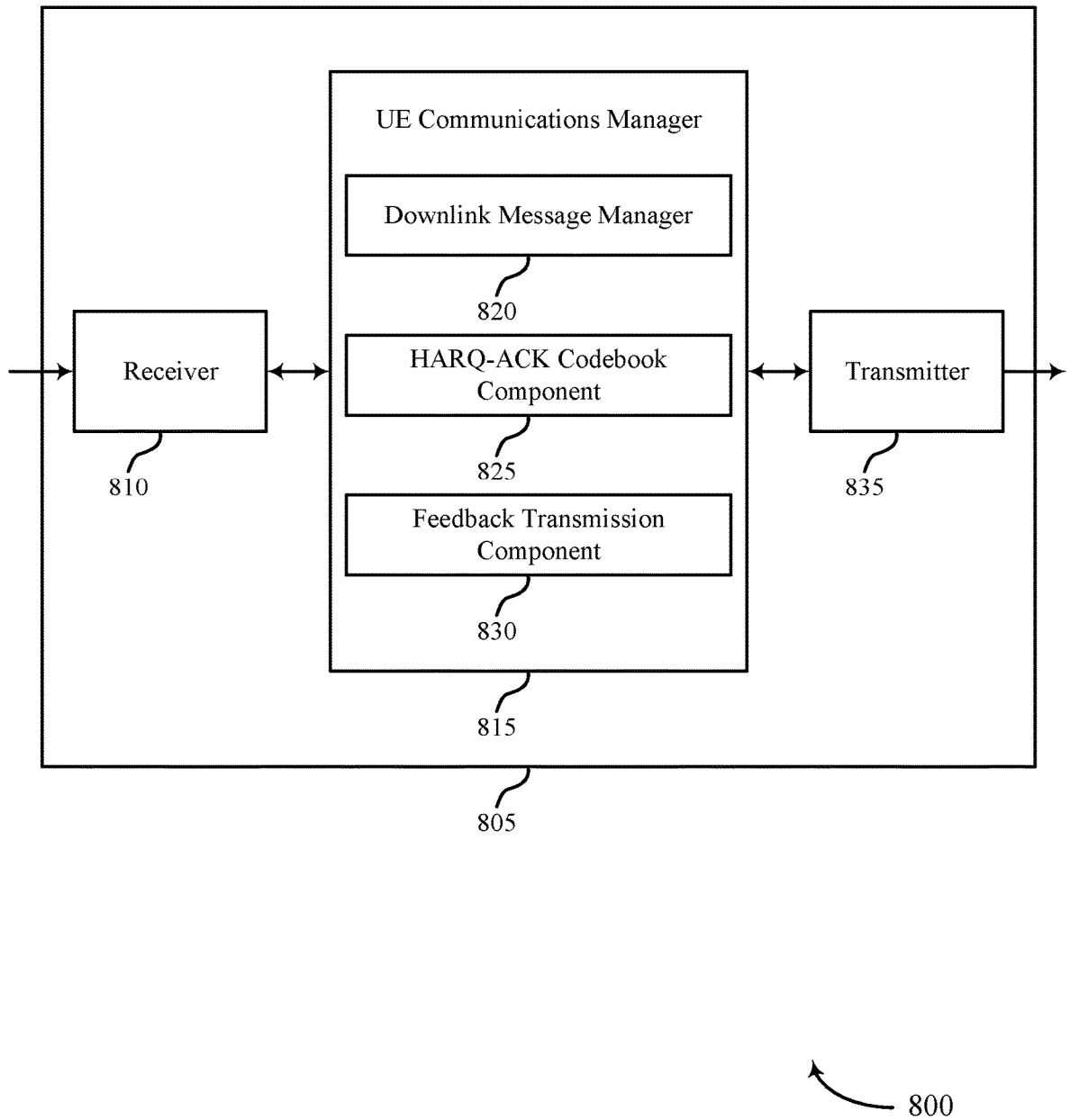

FIG. 8 shows a block diagram 800 of a device 805 that supports enhanced feedback with a dynamic codebook in accordance with aspects of the present disclosure. The device 805 may be an example of aspects of a device 705, or a UE 115 as described herein. The device 805 may include a receiver 810, a UE communications manager 815, and a transmitter 835. The device 805 may also include a processor. Each of these components may be in communication with one another (e.g., via one or more buses).

The receiver 810 may receive information such as packets, user data, or control information associated with various information channels (e.g., control channels, data channels, and information related to enhanced feedback with a dynamic codebook, etc.). Information may be passed on to other components of the device 805. The receiver 810 may be an example of aspects of the transceiver 1020 described with reference to FIG. 10. The receiver 810 may utilize a single antenna or a set of antennas.

The UE communications manager 815 may be an example of aspects of the UE communications manager 715 as described herein. The UE communications manager 815 may include a downlink message manager 820, a HARQ-ACK codebook component 825, and a feedback transmission component 830. The UE communications manager 815 may be an example of aspects of the UE communications manager 1010 described herein.

The downlink message manager 820 may determine, for one or more monitoring occasions, whether a set of downlink messages from a base station 105 have been detected by the UE 115. The HARQ-ACK codebook component 825 may generate, based on the determination, a HARQ-ACK codebook including an information bit for each detected downlink message of the set of downlink messages and determine a size of the HARQ-ACK codebook based on a number of information bits of the HARQ-ACK codebook.

The feedback transmission component 830 may transmit, to the base station 105, the HARQ-ACK codebook and an indication of the size of the HARQ-ACK codebook. The transmitter 835 may transmit signals generated by other components of the device 805. In some examples, the transmitter 835 may be collocated with a receiver 810 in a transceiver module. For example, the transmitter 835 may be an example of aspects of the transceiver 1020 described with reference to FIG. 10. The transmitter 835 may utilize a single antenna or a set of antennas.

Figure 9:
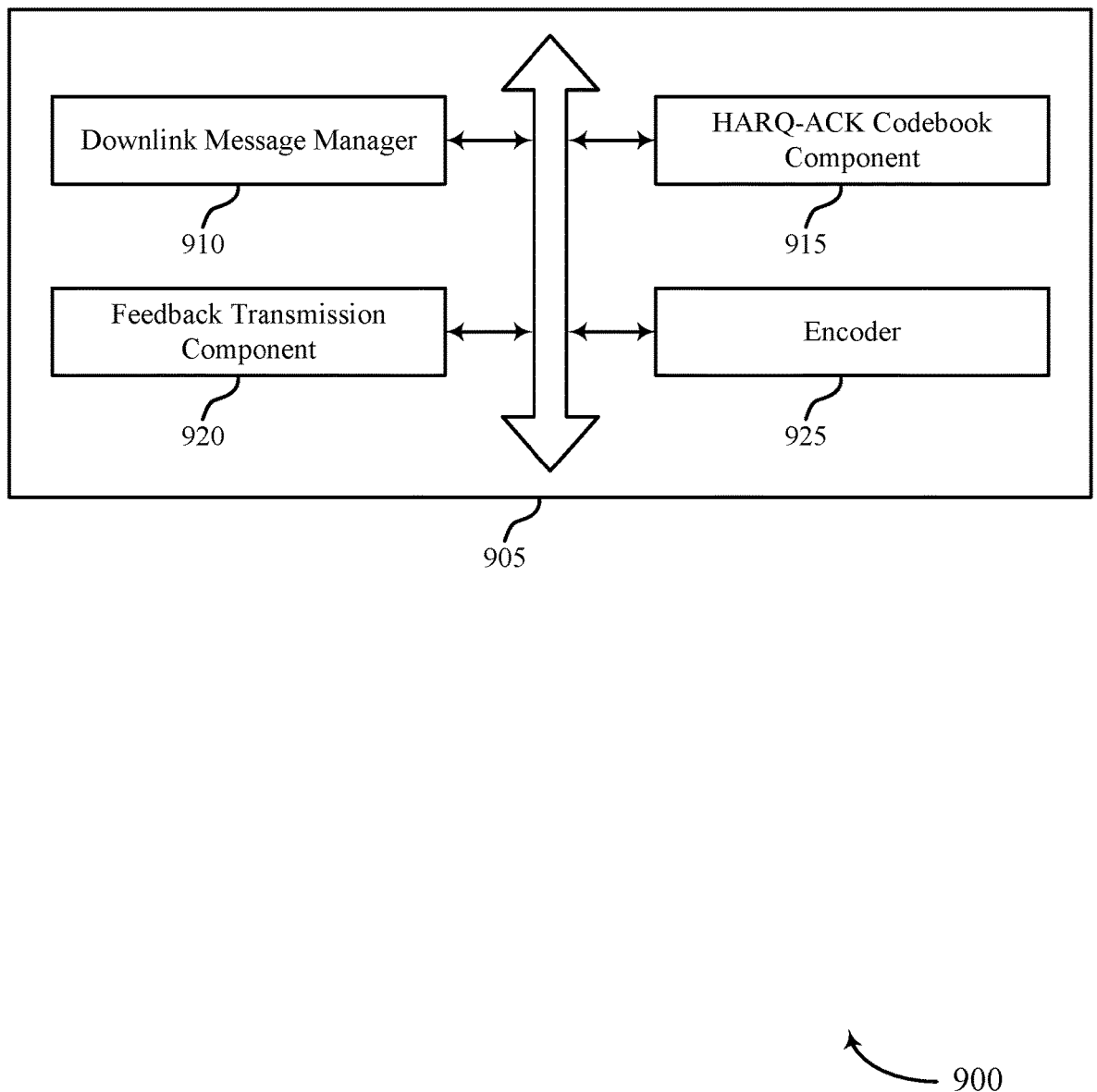
FIG. 9 shows a block diagram of a communications manager that supports enhanced feedback with a dynamic codebook in accordance with aspects of the present disclosure.

FIG. 9 shows a block diagram 900 of a UE communications manager 905 that supports enhanced feedback with a dynamic codebook in accordance with aspects of the present disclosure. The UE communications manager 905 may be an example of aspects of a UE communications manager 715, a UE communications manager 815, or a UE communications manager 1010 described herein. The UE communications manager 905 may include a downlink message manager 910, a HARQ-ACK codebook component 915, a feedback transmission component 920, and an encoder 925. Each of these modules may communicate, directly or indirectly, with one another (e.g., via one or more buses).

The downlink message manager 910 may determine, for one or more monitoring occasions, whether a set of downlink messages from a base station 105 have been detected by the UE 115. In some cases, the set of downlink messages include a PDCCH having a PDSCH allocation, or a PDCCH releasing a semi-persistently scheduled PDSCH, or a semi-persistent PDSCH, or a combination thereof.

The HARQ-ACK codebook component 915 may generate, based on the determination, a HARQ-ACK codebook including an information bit for each detected downlink message of the set of downlink messages. In some examples, the HARQ-ACK codebook component 915 may determine a size of the HARQ-ACK codebook based on a number of information bits of the HARQ-ACK codebook. In some cases, the HARQ-ACK codebook includes a dynamic codebook based on a number of detected downlink messages of the set of downlink messages.

The feedback transmission component 920 may transmit, to the base station 105, the HARQ-ACK codebook and an indication of the size of the HARQ-ACK codebook. In some examples, the feedback transmission component 920 may transmit the indication of the size of the HARQ-ACK codebook using a field having a predetermined size.

In some examples, the feedback transmission component 920 may map the encoded HARQ-ACK codebook and the encoded field to a set of uplink resources. In some examples, the feedback transmission component 920 may signal the number of information bits in the HARQ-ACK codebook. Additionally or alternatively, the feedback transmission component 920 may signal a value that represents the number of information bits in the HARQ-ACK codebook.

In some examples, the feedback transmission component 920 may transmit the HARQ-ACK codebook and the indication of the size of the HARQ-ACK codebook on a same set of uplink resources. For instance, the same set of uplink resources may include a same PUCCH or a same PUSCH, or another uplink channel. In some examples, the feedback transmission component 920 may transmit the HARQ-ACK codebook on a first set of uplink resources and transmit the indication of the size of the HARQ-ACK codebook on a second set of uplink resources. In some examples, the first set of uplink resources includes a first PUCCH or a first PUSCH. In some cases, the second set of uplink resources includes a second PUCCH or a second PUSCH.

In some cases, the feedback transmission component 920 may transmit the first set of uplink resources before transmitting the second set of uplink resources. In some examples, the feedback transmission component 920 may transmit the second set of uplink resources before transmitting the first set of uplink resources. In some examples, the feedback transmission component 920 may transmit the HARQ-ACK codebook on an uplink control channel.

In some examples, the feedback transmission component 920 may transmit the indication of the size of the HARQ-ACK codebook using a reference signal pattern associated with the uplink control channel, where the reference signal pattern is encoded to convey the size of the HARQ-ACK codebook.

The encoder 925 may encode the HARQ-ACK codebook using a first channel coding process. In some examples, the encoder 925 may encode the field including the indication of the size of the HARQ-ACK codebook using a second channel coding process.

Figure 10:
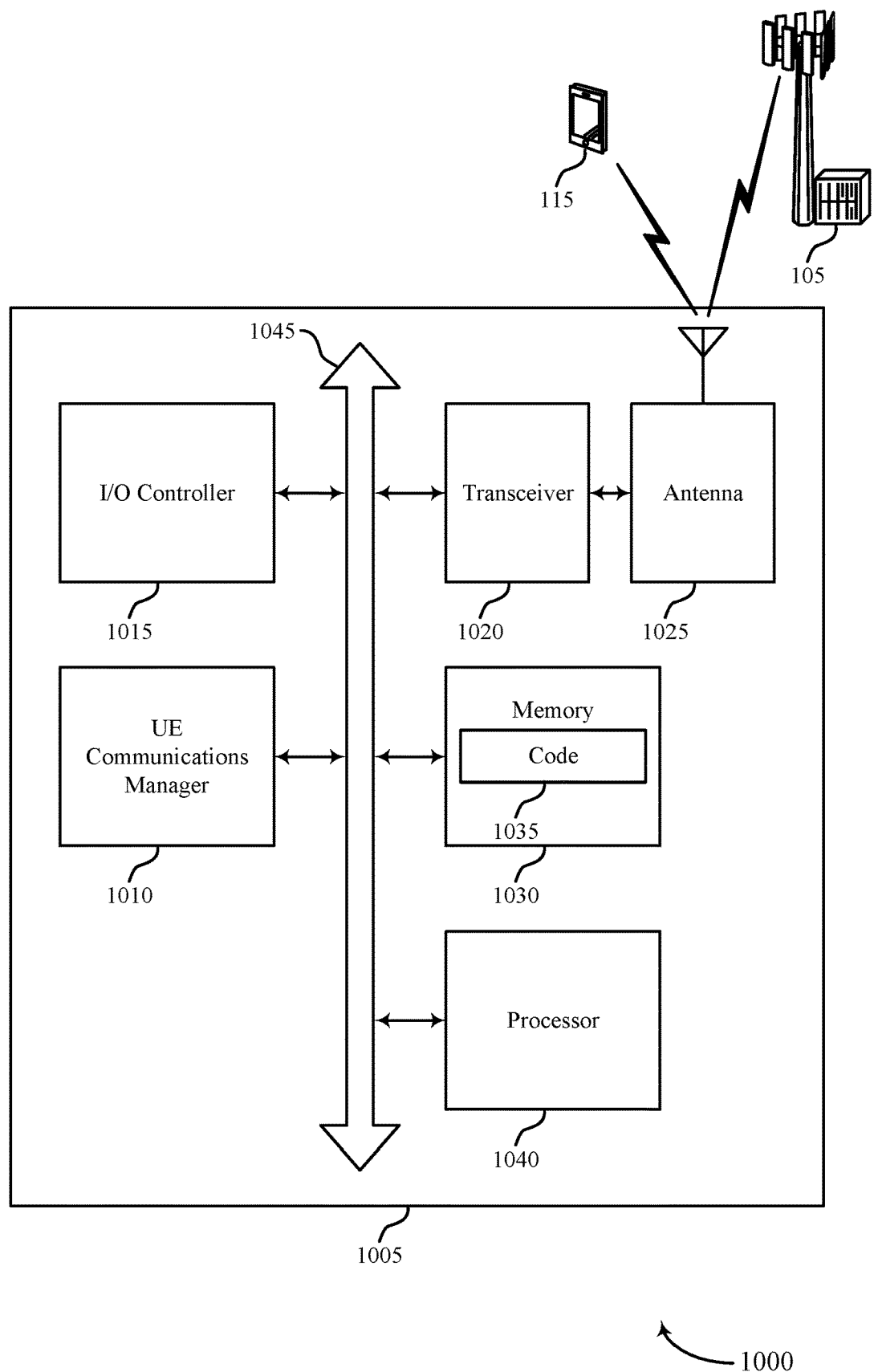
FIG. 10 shows a diagram of a system including a device that supports enhanced feedback with a dynamic codebook in accordance with aspects of the present disclosure.

FIG. 10 shows a diagram of a system 1000 including a device 1005 that supports enhanced feedback with a dynamic codebook in accordance with aspects of the present disclosure. The device 1005 may be an example of or include the components of device 705, device 805, or a UE 115 as described herein. The device 1005 may include components for bi-directional voice and data communications including components for transmitting and receiving communications, including a UE communications manager 1010, an I/O controller 1015, a transceiver 1020, an antenna 1025, memory 1030, and a processor 1040. These components may be in electronic communication via one or more buses (e.g., bus 1045).

The UE communications manager 1010 may determine, for one or more monitoring occasions, whether a set of downlink messages from a base station 105 have been detected by the UE 115, generate, based on the determination, a HARQ-ACK codebook including an information bit for each detected downlink message of the set of downlink messages, determine a size of the HARQ-ACK codebook based on a number of information bits of the HARQ-ACK codebook, and transmit, to the base station 105, the HARQ-ACK codebook and an indication of the size of the HARQ-ACK codebook.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described herein. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas. In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed, cause the processor to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting enhanced feedback with a dynamic codebook).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
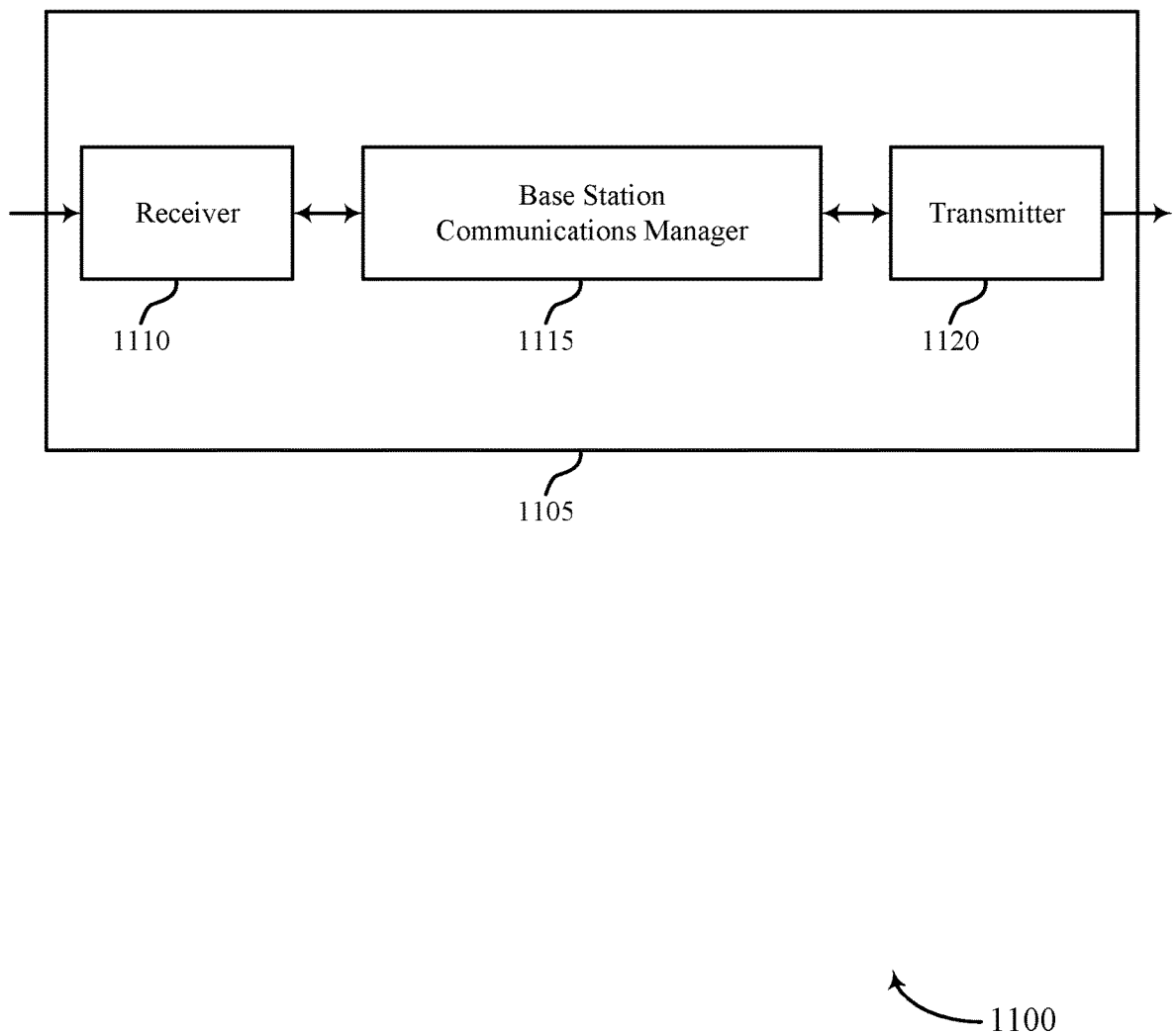
FIGS. 11 and 12 show block diagrams of devices that support enhanced feedback with a dynamic codebook in accordance with aspects of the present disclosure.

FIG. 11 shows a block diagram 1100 of a device 1105 that supports enhanced feedback with a dynamic codebook in accordance with aspects of the present disclosure. The device 1105 may be an example of aspects of a base station 105 as described herein. The device 1105 may include a receiver 1110, a base station communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to enhanced feedback with a dynamic codebook, etc.). Information may be passed on to other components of the device 1105. The receiver 1110 may be an example of aspects of the transceiver 1420 described with reference to FIG. 14. The receiver 1110 may utilize a single antenna or a set of antennas.

The base station communications manager 1115 may transmit, to a UE 115, a set of downlink messages during one or more transmission occasions, receive, from the UE 115, a HARQ-ACK codebook and an indication of a size of the HARQ-ACK codebook, the HARQ-ACK codebook including respective information bits for at least a subset of the set of downlink messages, determine the size of the HARQ-ACK codebook based on the indication of the size of the HARQ-ACK codebook, and decode the HARQ-ACK codebook based on the size of the HARQ-ACK codebook. The base station communications manager 1115 may be an example of aspects of the base station communications manager 1410 described herein.

The base station communications manager 1115, or its sub-components, may be implemented in hardware, code (e.g., software or firmware) executed by a processor, or any combination thereof. If implemented in code executed by a processor, the functions of the base station communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1115, or its sub-components, may be physically located at various positions, including being distributed such that portions of functions are implemented at different physical locations by one or more physical components. In some examples, the base station communications manager 1115, or its sub-components, may be a separate and distinct component in accordance with various aspects of the present disclosure. In some examples, the base station communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
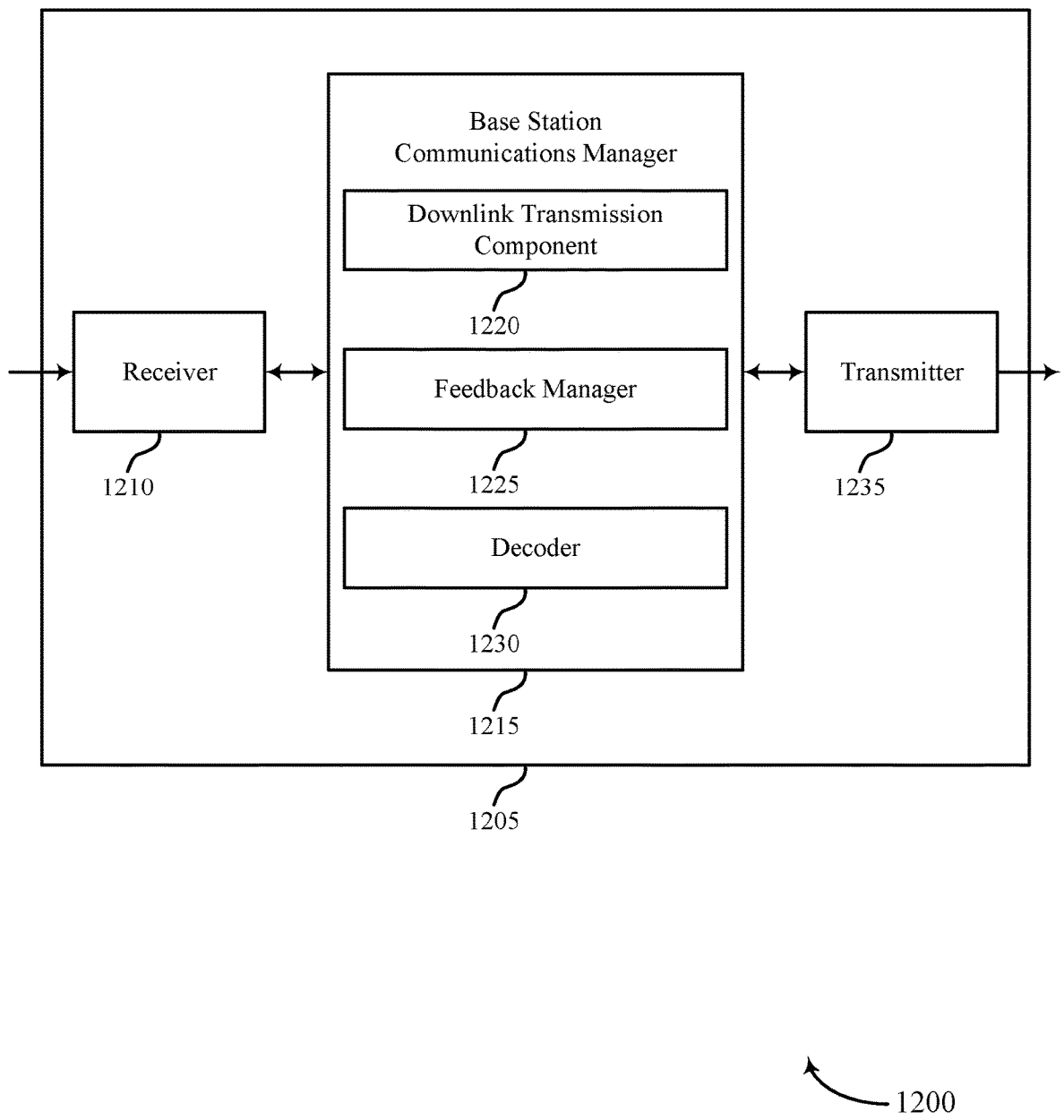

FIG. 12 shows a block diagram 1200 of a device 1205 that supports enhanced feedback with a dynamic codebook in accordance with aspects of the present disclosure. The device 1205 may be an example of aspects of a device 1105, or a base station 105 as described herein. The device 1205 may include a receiver 1210, a base station communications manager 1215, and a transmitter 1235. The device 1205 may also include a processor. Each of these components may be in communication with one another (e.g., via one or more buses).

The receiver 1210 may receive information such as packets, user data, or control information associated with various information channels (e.g., control channels, data channels, and information related to enhanced feedback with a dynamic codebook, etc.). Information may be passed on to other components of the device 1205. The receiver 1210 may be an example of aspects of the transceiver 1420 described with reference to FIG. 14. The receiver 1210 may utilize a single antenna or a set of antennas.

The base station communications manager 1215 may be an example of aspects of the base station communications manager 1115 as described herein. The base station communications manager 1215 may include a downlink transmission component 1220, a feedback manager 1225, and a decoder 1230. The base station communications manager 1215 may be an example of aspects of the base station communications manager 1410 described herein.

The downlink transmission component 1220 may transmit, to a UE 115, a set of downlink messages during one or more transmission occasions. The feedback manager 1225 may receive, from the UE 115, a HARQ-ACK codebook and an indication of a size of the HARQ-ACK codebook, the HARQ-ACK codebook including respective information bits for at least a subset of the set of downlink messages and determine the size of the HARQ-ACK codebook based on the indication of the size of the HARQ-ACK codebook. The decoder 1230 may decode the HARQ-ACK codebook based on the size of the HARQ-ACK codebook.

The transmitter 1235 may transmit signals generated by other components of the device 1205. In some examples, the transmitter 1235 may be collocated with a receiver 1210 in a transceiver module. For example, the transmitter 1235 may be an example of aspects of the transceiver 1420 described with reference to FIG. 14. The transmitter 1235 may utilize a single antenna or a set of antennas.

Figure 13:
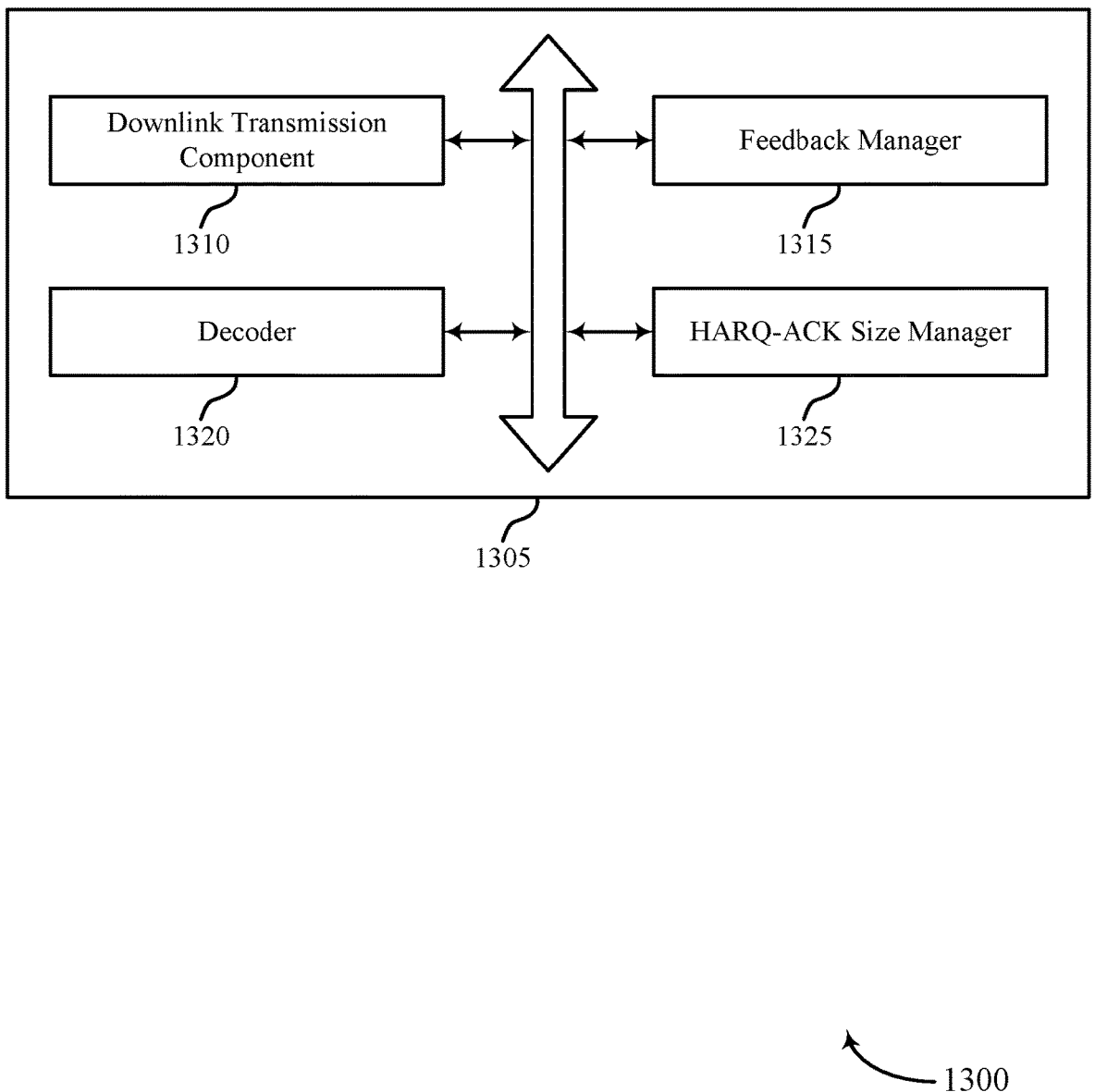
FIG. 13 shows a block diagram of a communications manager that supports enhanced feedback with a dynamic codebook in accordance with aspects of the present disclosure.

FIG. 13 shows a block diagram 1300 of a base station communications manager 1305 that supports enhanced feedback with a dynamic codebook in accordance with aspects of the present disclosure. The base station communications manager 1305 may be an example of aspects of a base station communications manager 1115, a base station communications manager 1215, or a base station communications manager 1410 described herein. The base station communications manager 1305 may include a downlink transmission component 1310, a feedback manager 1315, a decoder 1320, and a HARQ-ACK size manager 1325. Each of these modules may communicate, directly or indirectly, with one another (e.g., via one or more buses).

The downlink transmission component 1310 may transmit, to a UE 115, a set of downlink messages during one or more transmission occasions. In some cases, the set of downlink messages include a PDCCH having a PDSCH allocation, or a PDCCH releasing a semi-persistently scheduled PDSCH, or a semi-persistent PDSCH, or a combination thereof.

The feedback manager 1315 may receive, from the UE 115, a HARQ-ACK codebook and an indication of a size of the HARQ-ACK codebook, the HARQ-ACK codebook including respective information bits for at least a subset of the set of downlink messages. In some cases, the HARQ-ACK codebook includes a dynamic codebook based on a number of detected downlink messages of the set of downlink messages.

In some examples, the feedback manager 1315 may determine the size of the HARQ-ACK codebook based on the indication of the size of the HARQ-ACK codebook. In some examples, the feedback manager 1315 may determine, based on the comparison, whether the UE 115 failed to detect at least one downlink message from the set of downlink messages.

In some examples, the feedback manager 1315 may identify the at least one downlink message the UE 115 failed to detect based on the determination that the size of the HARQ-ACK codebook is different from the expected size of the HARQ-ACK codebook. In some examples, the feedback manager 1315 may receive an indication of the number of information bits in the HARQ-ACK codebook. Additionally or alternatively, the feedback manager 1315 may receive a value that represents the number of information bits in the HARQ-ACK codebook.

In some examples, the feedback manager 1315 may receive the indication of the size of the HARQ-ACK codebook via a field having a predetermined size. In some examples, the feedback manager 1315 may decode the field to obtain the size of the hybrid automatic repeat request-acknowledgment codebook. In some examples, the feedback manager 1315 may receive the HARQ-ACK codebook and the indication of the size of the HARQ-ACK codebook on a same set of uplink resources. In some cases, the same set of uplink resources includes a same PUCCH, a same PUSCH, or another channel.

In some examples, the feedback manager 1315 may receive the HARQ-ACK codebook on a first set of uplink resources. In some examples, the feedback manager 1315 may receive the indication of the size of the HARQ-ACK codebook on a second set of uplink resources. In some cases, the first set of uplink resources includes a first PUCCH or a first PUSCH. Similarly, the second set of uplink resources may include a second PUCCH or a second PUSCH. In some examples, the feedback manager 1315 may receive the first set of uplink resources before receiving the second set of uplink resources.

In some examples, the feedback manager 1315 may receive the first set of uplink resources after receiving the second set of uplink resources. In some examples, the feedback manager 1315 may receive the HARQ-ACK codebook on an uplink control channel. In some examples, the feedback manager 1315 may receive the indication of the size of the HARQ-ACK codebook via a reference signal pattern associated with the uplink control channel, where the reference signal pattern is encoded to convey the size of the HARQ-ACK codebook.

The decoder 1320 may decode the HARQ-ACK codebook based on the size of the HARQ-ACK codebook. The HARQ-ACK size manager 1325 may determine an expected size of the HARQ-ACK codebook based on the transmitted set of downlink messages. In some examples, the HARQ-ACK size manager 1325 may compare the expected size of the HARQ-ACK codebook to the size of the HARQ-ACK codebook. In some examples, the HARQ-ACK size manager 1325 may determine that the size of the HARQ-ACK codebook is different from the expected size of the HARQ-ACK codebook based on the comparison.

Figure 14:
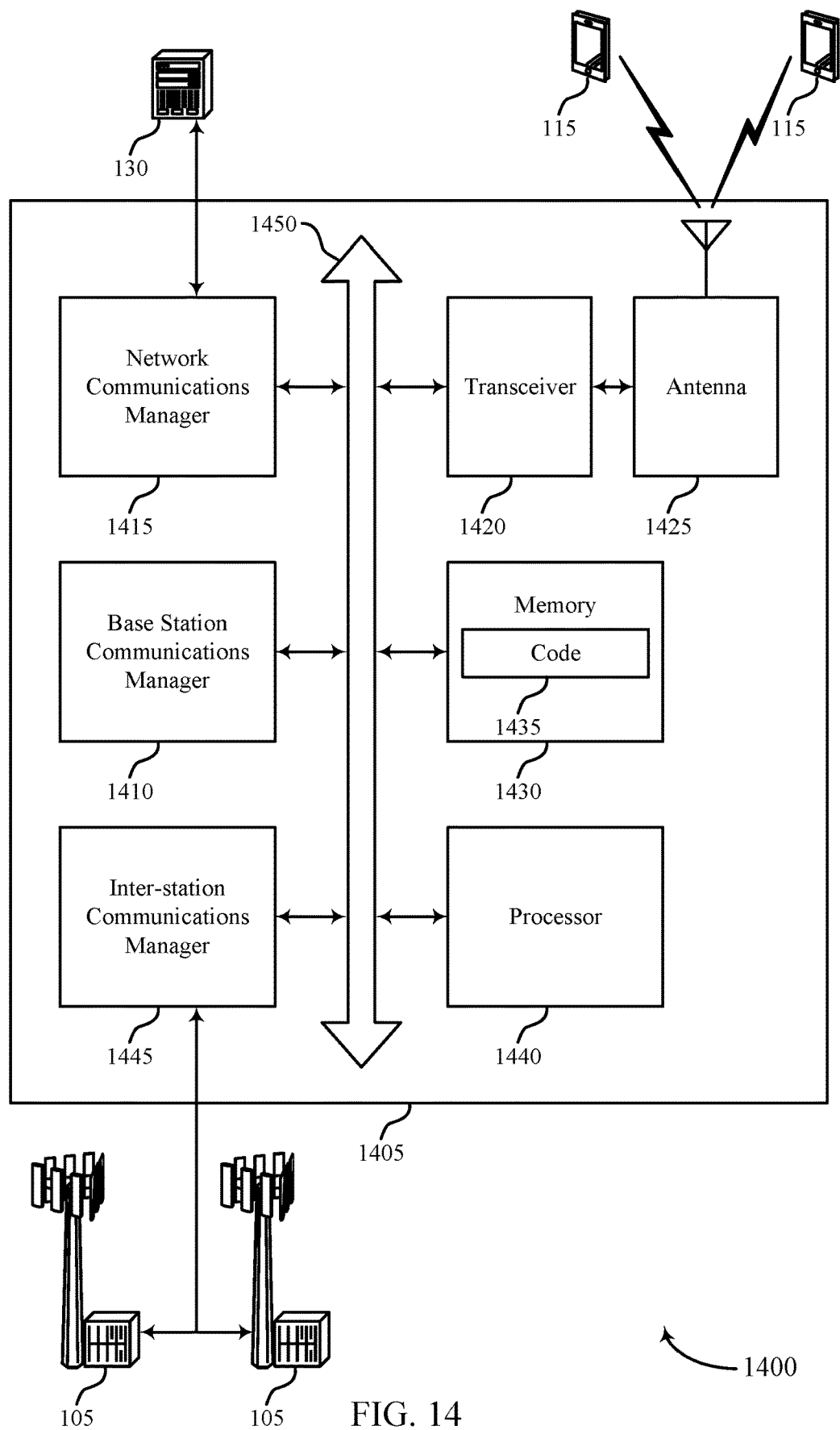
FIG. 14 shows a diagram of a system including a device that supports enhanced feedback with a dynamic codebook in accordance with aspects of the present disclosure.

FIG. 14 shows a diagram of a system 1400 including a device 1405 that supports enhanced feedback with a dynamic codebook in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a base station communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The base station communications manager 1410 may transmit, to a UE 115, a set of downlink messages during one or more transmission occasions, receive, from the UE 115, a HARQ-ACK codebook and an indication of a size of the HARQ-ACK codebook, the HARQ-ACK codebook including respective information bits for at least a subset of the set of downlink messages, determine the size of the HARQ-ACK codebook based on the indication of the size of the HARQ-ACK codebook, and decode the HARQ-ACK codebook based on the size of the HARQ-ACK codebook.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described herein. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas. In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting enhanced feedback with a dynamic codebook).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
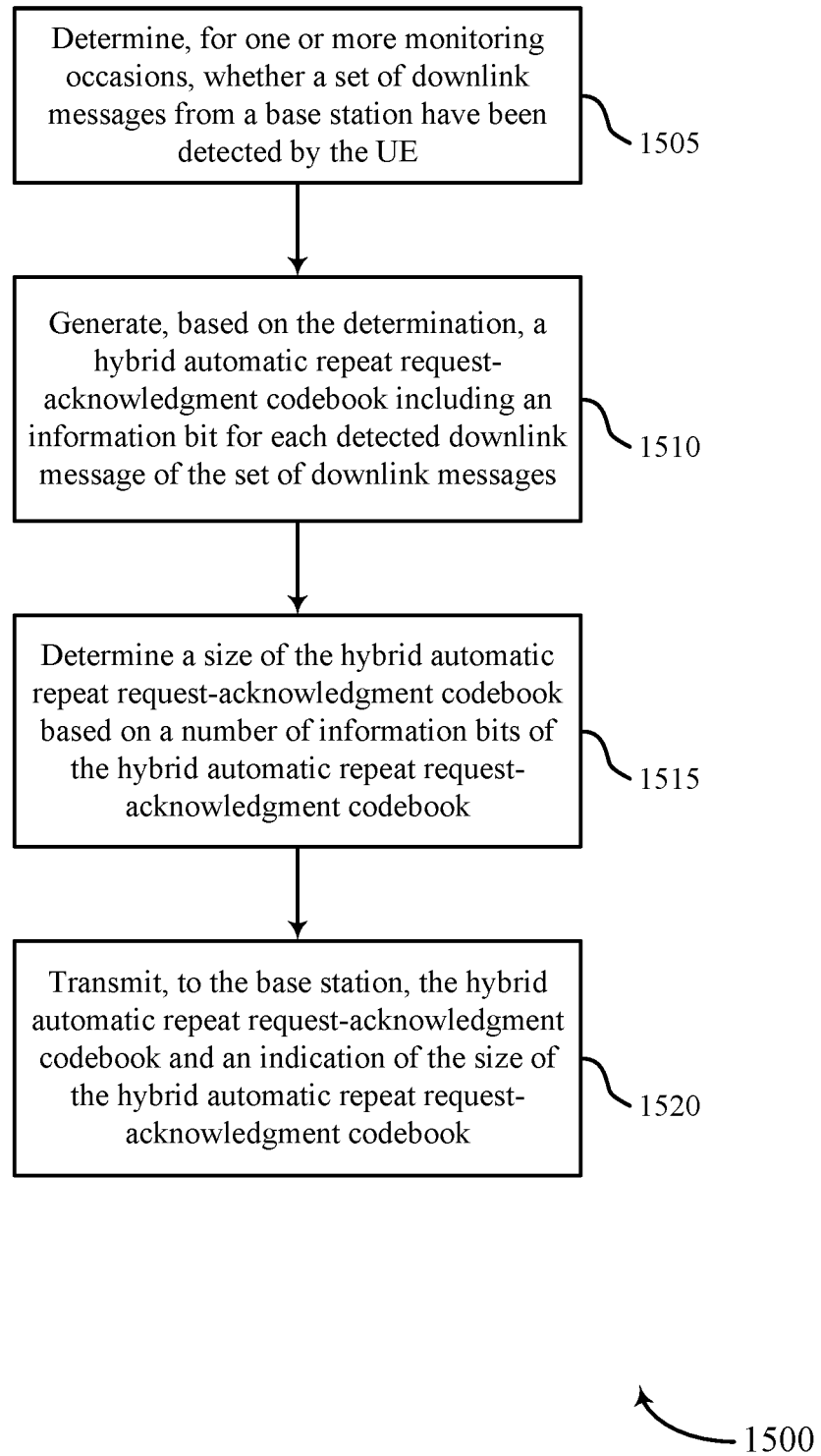
FIGS. 15 through 19 show flowcharts illustrating methods that support enhanced feedback with a dynamic codebook in accordance with aspects of the present disclosure.

FIG. 15 shows a flowchart illustrating a method 1500 that supports enhanced feedback with a dynamic codebook in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE 115 may execute a set of instructions to control the functional elements of the UE 115 to perform the functions described herein. Additionally or alternatively, a UE 115 may perform aspects of the functions described herein using special-purpose hardware.

At 1505, the UE 115 may determine, for one or more monitoring occasions, whether a set of downlink messages from a base station 105 have been detected by the UE 115. The operations of 1505 may be performed according to the methods described herein. In some examples, aspects of the operations of 1505 may be performed by a downlink message manager as described with reference to FIGS. 7 through 10.

At 1510, the UE 115 may generate, based on the determination, a HARQ-ACK codebook including an information bit for each detected downlink message of the set of downlink messages. The operations of 1510 may be performed according to the methods described herein. In some examples, aspects of the operations of 1510 may be performed by a HARQ-ACK codebook component as described with reference to FIGS. 7 through 10.

At 1515, the UE 115 may determine a size of the HARQ-ACK codebook based on a number of information bits of the HARQ-ACK codebook. The operations of 1515 may be performed according to the methods described herein. In some examples, aspects of the operations of 1515 may be performed by a HARQ-ACK codebook component as described with reference to FIGS. 7 through 10.

At 1520, the UE 115 may transmit, to the base station 105, the HARQ-ACK codebook and an indication of the size of the HARQ-ACK codebook. The operations of 1520 may be performed according to the methods described herein. In some examples, aspects of the operations of 1520 may be performed by a feedback transmission component as described with reference to FIGS. 7 through 10.

Figure 16:
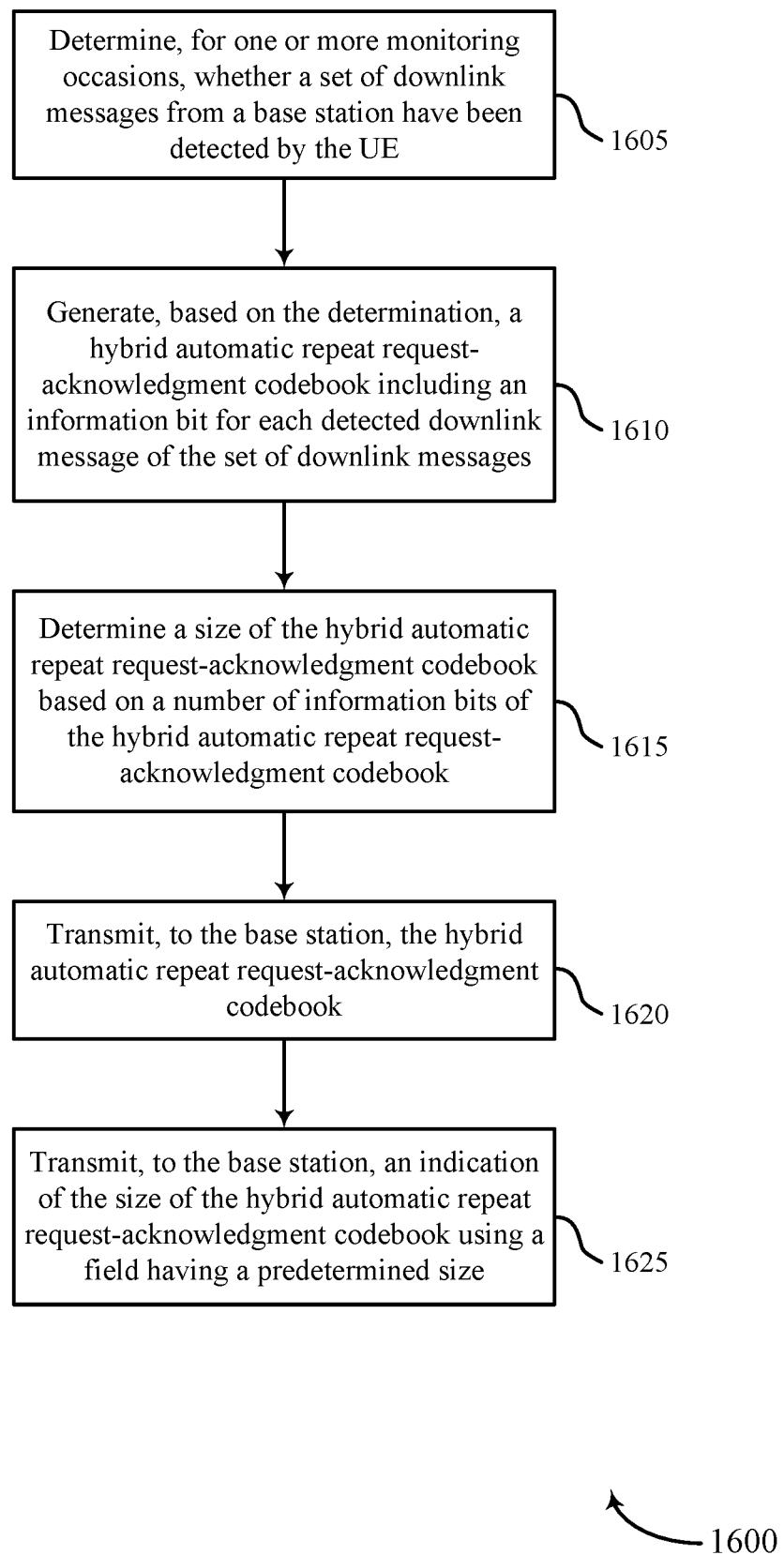

FIG. 16 shows a flowchart illustrating a method 1600 that supports enhanced feedback with a dynamic codebook in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1605, the UE 115 may determine, for one or more monitoring occasions, whether a set of downlink messages from a base station 105 have been detected by the UE 115. The operations of 1605 may be performed according to the methods described herein. In some examples, aspects of the operations of 1605 may be performed by a downlink message manager as described with reference to FIGS. 7 through 10.

At 1610, the UE 115 may generate, based on the determination, a HARQ-ACK codebook including an information bit for each detected downlink message of the set of downlink messages. The operations of 1610 may be performed according to the methods described herein. In some examples, aspects of the operations of 1610 may be performed by a HARQ-ACK codebook component as described with reference to FIGS. 7 through 10.

At 1615, the UE 115 may determine a size of the HARQ-ACK codebook based on a number of information bits of the HARQ-ACK codebook. The operations of 1615 may be performed according to the methods described herein. In some examples, aspects of the operations of 1615 may be performed by a HARQ-ACK codebook component as described with reference to FIGS. 7 through 10.

At 1620, the UE 115 may transmit, to the base station 105, the HARQ-ACK codebook. The operations of 1620 may be performed according to the methods described herein. In some examples, aspects of the operations of 1620 may be performed by a feedback transmission component as described with reference to FIGS. 7 through 10.

At 1625, the UE may transmit an indication of the size of the HARQ-ACK codebook using a field having a predetermined size. The operations of 1625 may be performed according to the methods described herein. In some examples, aspects of the operations of 1625 may be performed by a feedback transmission component as described with reference to FIGS. 7 through 10.

Figure 17:
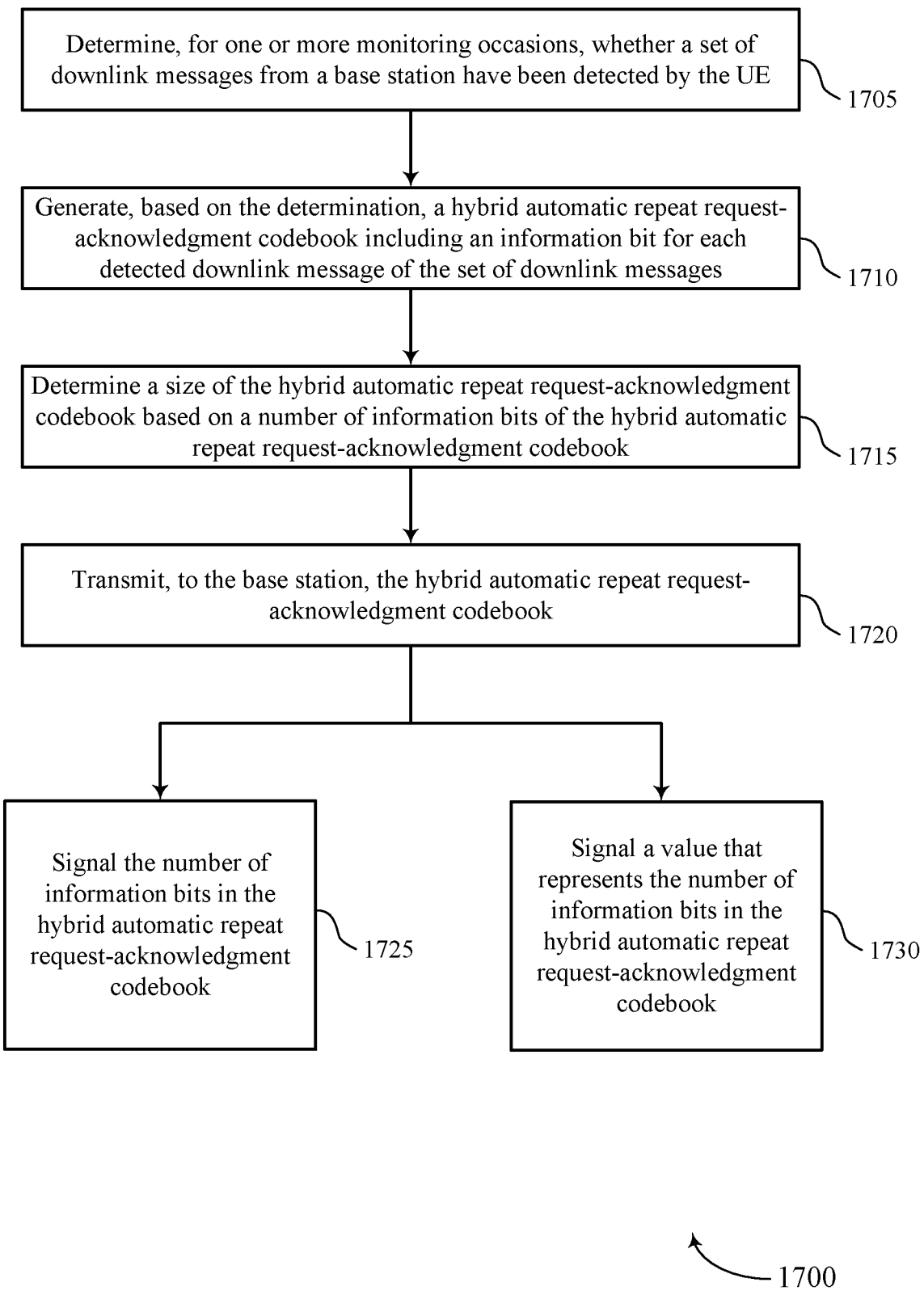

FIG. 17 shows a flowchart illustrating a method 1700 that supports enhanced feedback with a dynamic codebook in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1705, the UE 115 may determine, for one or more monitoring occasions, whether a set of downlink messages from a base station 105 have been detected by the UE 115. The operations of 1705 may be performed according to the methods described herein. In some examples, aspects of the operations of 1705 may be performed by a downlink message manager as described with reference to FIGS. 7 through 10.

At 1710, the UE 115 may generate, based on the determination, a HARQ-ACK codebook including an information bit for each detected downlink message of the set of downlink messages. The operations of 1710 may be performed according to the methods described herein. In some examples, aspects of the operations of 1710 may be performed by a HARQ-ACK codebook component as described with reference to FIGS. 7 through 10.

At 1715, the UE 115 may determine a size of the HARQ-ACK codebook based on a number of information bits of the HARQ-ACK codebook. The operations of 1715 may be performed according to the methods described herein. In some examples, aspects of the operations of 1715 may be performed by a HARQ-ACK codebook component as described with reference to FIGS. 7 through 10.

At 1720, the UE 115 may transmit, to the base station 105, the HARQ-ACK codebook. The operations of 1720 may be performed according to the methods described herein. In some examples, aspects of the operations of 1720 may be performed by a feedback transmission component as described with reference to FIGS. 7 through 10.

At 1725, the UE 115 may optionally signal the number of information bits in the HARQ-ACK codebook. The operations of 1725 may be performed according to the methods described herein. In some examples, aspects of the operations of 1725 may be performed by a feedback transmission component as described with reference to FIGS. 7 through 10.

Alternatively, at 1730, the UE 115 may signal a value that represents the number of information bits in the HARQ-ACK codebook. The operations of 1730 may be performed according to the methods described herein. In some examples, aspects of the operations of 1730 may be performed by a feedback transmission component as described with reference to FIGS. 7 through 10.

Figure 18:
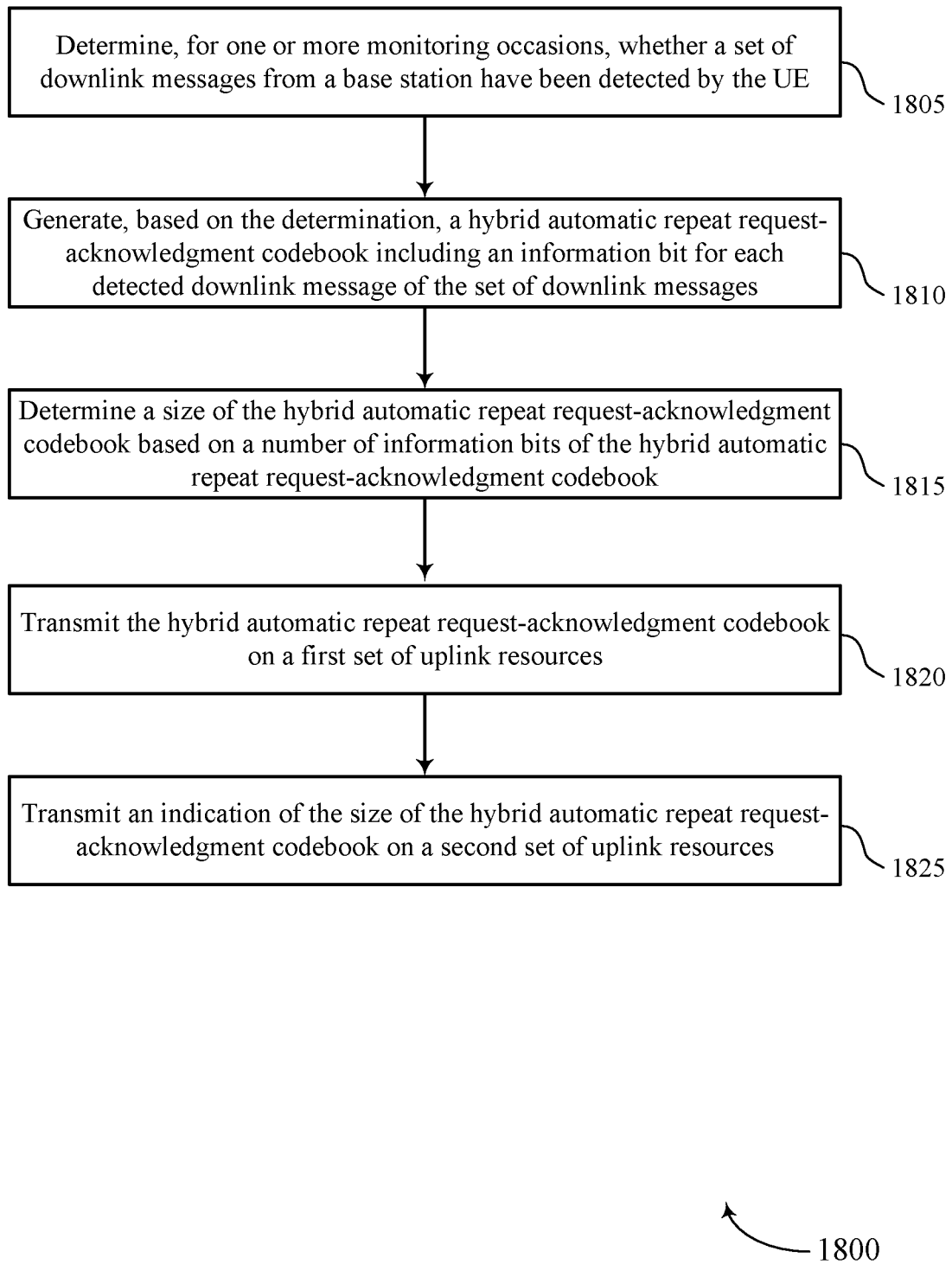

FIG. 18 shows a flowchart illustrating a method 1800 that supports enhanced feedback with a dynamic codebook in accordance with aspects of the present disclosure. The operations of method 1800 may be implemented by a UE 115 or its components as described herein. For example, the operations of method 1800 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 1805, the UE 115 may determine, for one or more monitoring occasions, whether a set of downlink messages from a base station 105 have been detected by the UE 115. The operations of 1805 may be performed according to the methods described herein. In some examples, aspects of the operations of 1805 may be performed by a downlink message manager as described with reference to FIGS. 7 through 10.

At 1810, the UE 115 may generate, based on the determination, a HARQ-ACK codebook including an information bit for each detected downlink message of the set of downlink messages. The operations of 1810 may be performed according to the methods described herein. In some examples, aspects of the operations of 1810 may be performed by a HARQ-ACK codebook component as described with reference to FIGS. 7 through 10.

At 1815, the UE 115 may determine a size of the HARQ-ACK codebook based on a number of information bits of the HARQ-ACK codebook. The operations of 1815 may be performed according to the methods described herein. In some examples, aspects of the operations of 1815 may be performed by a HARQ-ACK codebook component as described with reference to FIGS. 7 through 10.

At 1820, the UE 115 may transmit, to the base station 105, the HARQ-ACK codebook on a first set of resources. The operations of 1820 may be performed according to the methods described herein. In some examples, aspects of the operations of 1820 may be performed by a feedback transmission component as described with reference to FIGS. 7 through 10.

At 1825, the UE 115 may transmit an indication of the size of the HARQ-ACK codebook on a second set of uplink resources. In some cases, the first set of resources and the second set of resources may be the same resources. In other examples, the first set of resources and the second set of resources may be different resources. In another example, the first and second set of resources may include uplink channels, such as PUSCH or PUCCH used to transmit the HARQ-ACK codebook and the size of the HARQ-ACK codebook. The operations of 1825 may be performed according to the methods described herein. In some examples, aspects of the operations of 1825 may be performed by a feedback transmission component as described with reference to FIGS. 7 through 10.

Figure 19:
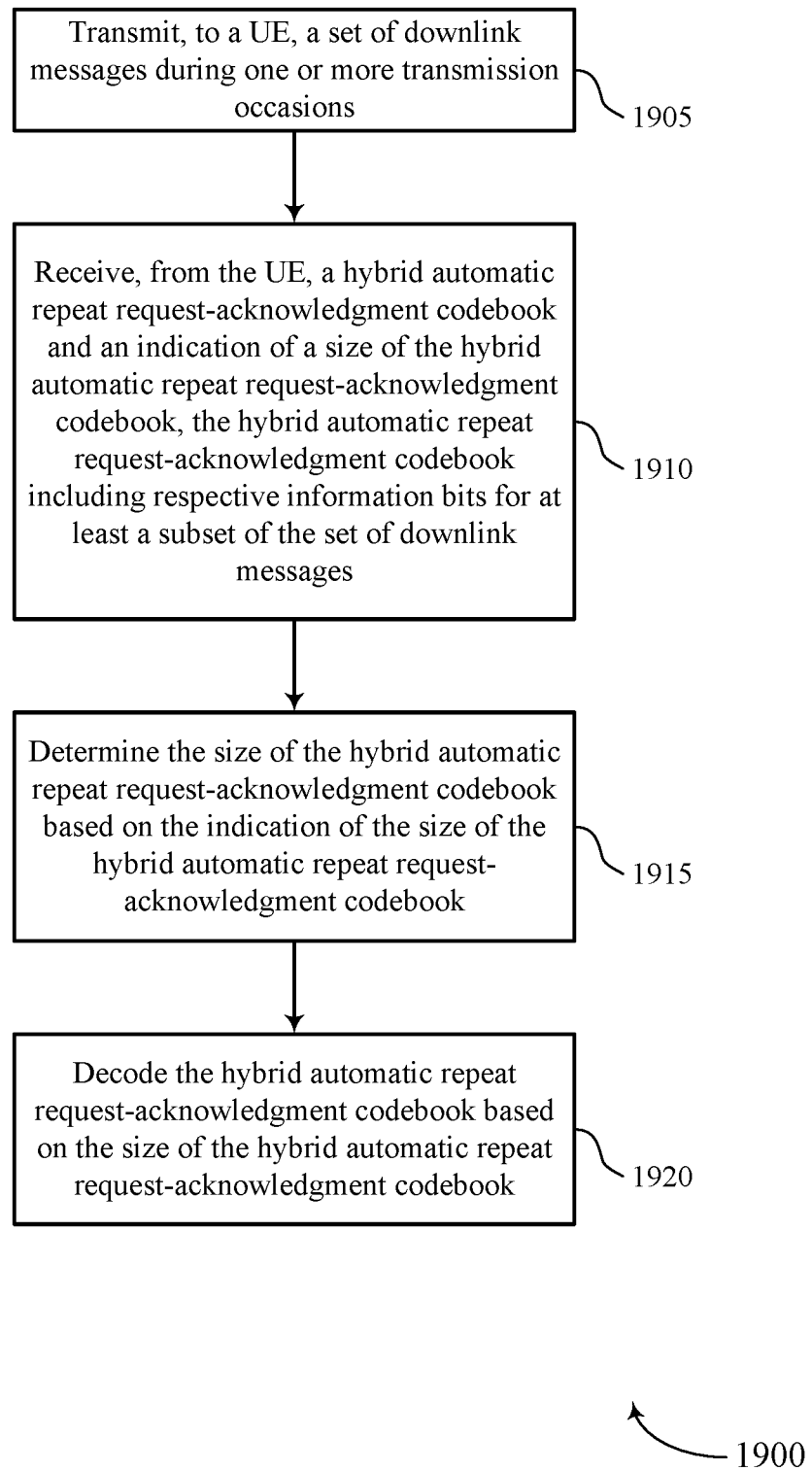

FIG. 19 shows a flowchart illustrating a method 1900 that supports enhanced feedback with a dynamic codebook in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station 105 to perform the functions described herein. Additionally or alternatively, a base station 105 may perform aspects of the functions described herein using special-purpose hardware.

At 1905, the base station 105 may transmit, to a UE 115, a set of downlink messages during one or more transmission occasions. The operations of 1905 may be performed according to the methods described herein. In some examples, aspects of the operations of 1905 may be performed by a downlink transmission component as described with reference to FIGS. 11 through 14.

At 1910, the base station 105 may receive, from the UE 115, a HARQ-ACK codebook and an indication of a size of the HARQ-ACK codebook, the HARQ-ACK codebook including respective information bits for at least a subset of the set of downlink messages. The operations of 1910 may be performed according to the methods described herein. In some examples, aspects of the operations of 1910 may be performed by a feedback manager as described with reference to FIGS. 11 through 14.

At 1915, the base station 105 may determine the size of the HARQ-ACK codebook based on the indication of the size of the HARQ-ACK codebook. The operations of 1915 may be performed according to the methods described herein. In some examples, aspects of the operations of 1915 may be performed by a feedback manager as described with reference to FIGS. 11 through 14.

At 1920, the base station 105 may decode the HARQ-ACK codebook based on the size of the HARQ-ACK codebook. The operations of 1920 may be performed according to the methods described herein. In some examples, aspects of the operations of 1920 may be performed by a decoder as described with reference to FIGS. 11 through 14.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Embodiment 1

A method for wireless communication at a UE, comprising: determining, for one or more monitoring occasions, whether a set of downlink messages from a base station have been detected by the UE; generating, based at least in part on the determination, a hybrid automatic repeat request-acknowledgment codebook comprising an information bit for each detected downlink message of the set of downlink messages; determining a size of the hybrid automatic repeat request-acknowledgment codebook based at least in part on a number of information bits of the hybrid automatic repeat request-acknowledgment codebook; and transmitting, to the base station, the hybrid automatic repeat request-acknowledgment codebook and an indication of the size of the hybrid automatic repeat request-acknowledgment codebook.

Embodiment 2

The method of embodiment 1, wherein transmitting the indication of the size of the hybrid automatic repeat request-acknowledgment codebook comprises: transmitting the indication of the size of the hybrid automatic repeat request-acknowledgment codebook using a field having a predetermined size.

Embodiment 3

The method of embodiments 1 or 2, further comprising: encoding the hybrid automatic repeat request-acknowledgment codebook using a first channel coding process; encoding the field comprising the indication of the size of the hybrid automatic repeat request-acknowledgment codebook using a second channel coding process; and mapping the encoded hybrid automatic repeat request-acknowledgment codebook and the encoded field to a set of uplink resources.

Embodiment 4

The method of any of embodiments 1 through 3, wherein transmitting the indication of the size of the hybrid automatic repeat request-acknowledgment codebook comprises: signaling the number of information bits in the hybrid automatic repeat request-acknowledgment codebook; or signaling a value that represents the number of information bits in the hybrid automatic repeat request-acknowledgment codebook.

Embodiment 5

The method of any of embodiments 1 through 4, wherein transmitting the hybrid automatic repeat request-acknowledgment codebook and the indication of the size of the hybrid automatic repeat request-acknowledgment codebook comprises: transmitting the hybrid automatic repeat request-acknowledgment codebook and the indication of the size of the hybrid automatic repeat request-acknowledgment codebook on a same set of uplink resources Embodiment 6

The method of embodiment 5, wherein the same set of uplink resources comprises a same physical uplink control channel or a same physical uplink shared channel.

Embodiment 7

The method of any of embodiments 1 through 4, wherein transmitting the hybrid automatic repeat request-acknowledgment codebook and the indication of the size of the hybrid automatic repeat request-acknowledgment codebook comprises: transmitting the hybrid automatic repeat request-acknowledgment codebook on a first set of uplink resources; and transmitting the indication of the size of the hybrid automatic repeat request-acknowledgment codebook on a second set of uplink resources.

Embodiment 8

The method of embodiment 7, further comprising: transmitting the first set of uplink resources before transmitting the second set of uplink resources.

Embodiment 9

The method of embodiment 7, further comprising: transmitting the second set of uplink resources before transmitting the first set of uplink resources.

Embodiment 10

The method of embodiment 7, wherein: the first set of uplink resources comprises a first physical uplink control channel PUCCH or a first PUSCH; and the second set of uplink resources comprises a second PUCCH or a second PUSCH.

Embodiment 11

The method of any of embodiments 1 through 10, wherein transmitting the hybrid automatic repeat request-acknowledgment codebook and the indication of the size of the hybrid automatic repeat request-acknowledgment codebook comprises: transmitting the hybrid automatic repeat request-acknowledgment codebook on an uplink control channel; and transmitting the indication of the size of the hybrid automatic repeat request-acknowledgment codebook using a reference signal pattern associated with the uplink control channel, wherein the reference signal pattern is encoded to convey the size of the hybrid automatic repeat request-acknowledgment codebook.

Embodiment 12

The method of any of embodiments 1 through 11, wherein the hybrid automatic repeat request-acknowledgment codebook comprises a dynamic codebook based at least in part on a number of detected downlink messages of the set of downlink messages.

Embodiment 13

The method of any of embodiments 1 through 12, wherein the set of downlink messages comprise a physical downlink control channel (PDCCH) having a physical downlink shared channel (PDSCH) allocation, or a PDCCH releasing a semi-persistently scheduled PDSCH, or a semi-persistent PDSCH, or a combination thereof.

Embodiment 14

An apparatus comprising at least one means for performing a method of any of embodiments 1 to 13.

Embodiment 15

An apparatus for wireless communications comprising: a processor; memory coupled with the processor; and instructions stored in the memory and executable by the processor to cause the apparatus to perform a method of any of embodiments 1 to 13.

Embodiment 16

A non-transitory computer-readable medium storing code for wireless communications, the code comprising instructions executable by a processor to perform a method of any of embodiments 1 to 13.

Embodiment 17

A method for wireless communication at a base station, comprising: transmitting, to a UE, a set of downlink messages during one or more transmission occasions; receiving, from the UE, a hybrid automatic repeat request-acknowledgment codebook and an indication of a size of the hybrid automatic repeat request-acknowledgment codebook, the hybrid automatic repeat request-acknowledgment codebook comprising respective information bits for at least a subset of the set of downlink messages; determining the size of the hybrid automatic repeat request-acknowledgment codebook based at least in part on the indication of the size of the hybrid automatic repeat request-acknowledgment codebook; and decoding the hybrid automatic repeat request-acknowledgment codebook based at least in part on the size of the hybrid automatic repeat request-acknowledgment codebook.

Embodiment 18

The method of embodiment 17, further comprising: determining an expected size of the hybrid automatic repeat request-acknowledgment codebook based at least in part on the transmitted set of downlink messages; comparing the expected size of the hybrid automatic repeat request-acknowledgment codebook to the size of the hybrid automatic repeat request-acknowledgment codebook; and determining, based at least in part on the comparison, whether the UE failed to detect at least one downlink message from the set of downlink messages.

Embodiment 19

The method of embodiments 17 or 18, further comprising: determining that the size of the hybrid automatic repeat request-acknowledgment codebook is different from the expected size of the hybrid automatic repeat request-acknowledgment codebook based at least in part on the comparison; and identifying the at least one downlink message the UE failed to detect based at least in part on the determination that the size of the hybrid automatic repeat request-acknowledgment codebook is different from the expected size of the hybrid automatic repeat request-acknowledgment codebook.

Embodiment 20

The method of any of embodiments 17 through 19, wherein receiving the indication of the size of the hybrid automatic repeat request-acknowledgment codebook comprises: receiving an indication of the number of information bits in the hybrid automatic repeat request-acknowledgment codebook; or receiving a value that represents the number of information bits in the hybrid automatic repeat request-acknowledgment codebook.

Embodiment 21

The method of any of embodiments 17 through 20, wherein receiving the indication of the size of the hybrid automatic repeat request-acknowledgment codebook comprises: receiving the indication of the size of the hybrid automatic repeat request-acknowledgment codebook via a field having a predetermined size, the method further comprising: decoding the field to obtain the size of the hybrid automatic repeat request-acknowledgment codebook.

Embodiment 22

The method of any of embodiments 17 through 21, wherein receiving the hybrid automatic repeat request-acknowledgment codebook and the indication of the size of the hybrid automatic repeat request-acknowledgment codebook comprises: receiving the hybrid automatic repeat request-acknowledgment codebook and the indication of the size of the hybrid automatic repeat request-acknowledgment codebook on a same set of uplink resources Embodiment 23

The method of embodiment 22, wherein the same set of uplink resources comprises a same PUCCH or a same PUSCH.

Embodiment 24

The method of any of embodiments 17 through 21, wherein receiving the hybrid automatic repeat request-acknowledgment codebook and the indication of the size of the hybrid automatic repeat request-acknowledgment codebook comprises: receiving the hybrid automatic repeat request-acknowledgment codebook on a first set of uplink resources; and receiving the indication of the size of the hybrid automatic repeat request-acknowledgment codebook on a second set of uplink resources Embodiment 25

The method of embodiment 24, further comprising: receiving the first set of uplink resources before receiving the second set of uplink resources.

Embodiment 26

The method of embodiment 24, further comprising: receiving the first set of uplink resources after receiving the second set of uplink resources.

Embodiment 27

The method of embodiment 24, wherein: the first set of uplink resources comprises a first PUCCH or a first PUSCH; and the second set of uplink resources comprises a second PUCCH or a second PUSCH.

Embodiment 28

The method of any of embodiments 17 through 27, wherein receiving the hybrid automatic repeat request-acknowledgment codebook and the indication of the size of the hybrid automatic repeat request-acknowledgment codebook comprises: receiving the hybrid automatic repeat request-acknowledgment codebook on an uplink control channel; and receiving the indication of the size of the hybrid automatic repeat request-acknowledgment codebook via a reference signal pattern associated with the uplink control channel, wherein the reference signal pattern is encoded to convey the size of the hybrid automatic repeat request-acknowledgment codebook.

Embodiment 29

The method of any of embodiments 17 through 28, wherein the hybrid automatic repeat request-acknowledgment codebook comprises a dynamic codebook based at least in part on a number of detected downlink messages of the set of downlink messages Embodiment 30

The method of any of embodiments 17 through 29, wherein the set of downlink messages comprise a PDCCH having a physical downlink shared channel PDSCH allocation, or a PDCCH releasing a semi-persistently scheduled PDSCH, or a semi-persistent PDSCH, or a combination thereof.

Embodiment 31

An apparatus comprising at least one means for performing a method of any of embodiments 17 to 30.

Embodiment 32

An apparatus for wireless communications comprising: a processor; memory coupled with the processor; and instructions stored in the memory and executable by the processor to cause the apparatus to perform a method of any of embodiments 17 to 30.

Embodiment 33

A non-transitory computer-readable medium storing code for wireless communications, the code comprising instructions executable by a processor to perform a method of any of embodiments 17 to 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    determining, for one or more monitoring occasions, whether a set of downlink messages from a base station have been detected by the UE;
    generating, based at least in part on the determination, a hybrid automatic repeat request-acknowledgment codebook comprising an information bit for each detected downlink message of the set of downlink messages;
    determining a size of the hybrid automatic repeat request-acknowledgment codebook based at least in part on a number of information bits of the hybrid automatic repeat request-acknowledgment codebook; and
    transmitting, to the base station, the hybrid automatic repeat request-acknowledgment codebook and an indication of the size of the hybrid automatic repeat request-acknowledgment codebook.

2. The method of claim 1, wherein transmitting the indication of the size of the hybrid automatic repeat request-acknowledgment codebook comprises:
    transmitting the indication of the size of the hybrid automatic repeat request-acknowledgment codebook using a field having a predetermined size.

3. The method of claim 2, further comprising:
    encoding the hybrid automatic repeat request-acknowledgment codebook using a first channel coding process;
    encoding the field comprising the indication of the size of the hybrid automatic repeat request-acknowledgment codebook using a second channel coding process; and
    mapping the encoded hybrid automatic repeat request-acknowledgment codebook and the encoded field to a set of uplink resources.

4. The method of claim 1, wherein transmitting the indication of the size of the hybrid automatic repeat request-acknowledgment codebook comprises:
    signaling the number of information bits in the hybrid automatic repeat request-acknowledgment codebook; or
    signaling a value that represents the number of information bits in the hybrid automatic repeat request-acknowledgment codebook.

5. The method of claim 1, wherein transmitting the hybrid automatic repeat request-acknowledgment codebook and the indication of the size of the hybrid automatic repeat request-acknowledgment codebook comprises:
    transmitting the hybrid automatic repeat request-acknowledgment codebook and the indication of the size of the hybrid automatic repeat request-acknowledgment codebook on a same set of uplink resources.

6. The method of claim 5, wherein the same set of uplink resources comprises a same physical uplink control channel (PUCCH) or a same physical uplink shared channel (PUSCH).

7. The method of claim 1, wherein transmitting the hybrid automatic repeat request-acknowledgment codebook and the indication of the size of the hybrid automatic repeat request-acknowledgment codebook comprises:
    transmitting the hybrid automatic repeat request-acknowledgment codebook on a first set of uplink resources; and
    transmitting the indication of the size of the hybrid automatic repeat request-acknowledgment codebook on a second set of uplink resources.

8. The method of claim 7, further comprising:
    transmitting the first set of uplink resources before transmitting the second set of uplink resources.

9. The method of claim 7, further comprising:
    transmitting the second set of uplink resources before transmitting the first set of uplink resources.

10. The method of claim 7, wherein:
    the first set of uplink resources comprises a first physical uplink control channel (PUCCH) or a first physical uplink shared channel (PUSCH); and
    the second set of uplink resources comprises a second PUCCH or a second PUSCH.

11. The method of claim 1, wherein transmitting the hybrid automatic repeat request-acknowledgment codebook and the indication of the size of the hybrid automatic repeat request-acknowledgment codebook comprises:

transmitting the hybrid automatic repeat request-acknowledgment codebook on an uplink control channel; and transmitting the indication of the size of the hybrid automatic repeat request-acknowledgment codebook using a reference signal pattern associated with the uplink control channel, wherein the reference signal pattern is encoded to convey the size of the hybrid automatic repeat request-acknowledgment codebook.

12. The method of claim 1, wherein the hybrid automatic repeat request-acknowledgment codebook comprises a dynamic codebook based at least in part on a number of detected downlink messages of the set of downlink messages.

13. The method of claim 1, wherein the set of downlink messages comprise a physical downlink control channel (PDCCH) having a physical downlink shared channel (PDSCH) allocation, or a PDCCH releasing a semi-persistently scheduled PDSCH, or a semi-persistent PDSCH, or a combination thereof.

14. A method for wireless communication at a base station, comprising:

transmitting, to a user equipment (UE), a set of downlink messages during one or more transmission occasions;

receiving, from the UE, a hybrid automatic repeat request-acknowledgment codebook and an indication of a size of the hybrid automatic repeat request-acknowledgment codebook, the hybrid automatic repeat request-acknowledgment codebook comprising respective information bits for at least a subset of the set of downlink messages, wherein the hybrid automatic repeat request-acknowledgment codebook comprises a dynamic codebook based at least in part on a number of detected downlink messages of the set of downlink messages;

determining the size of the hybrid automatic repeat request-acknowledgment codebook based at least in part on the indication of the size of the hybrid automatic repeat request-acknowledgment codebook; and decoding the hybrid automatic repeat request-acknowledgment codebook based at least in part on the size of the hybrid automatic repeat request-acknowledgment codebook.

15. The method of claim 14, further comprising:

determining an expected size of the hybrid automatic repeat request-acknowledgment codebook based at least in part on the transmitted set of downlink messages;

comparing the expected size of the hybrid automatic repeat request-acknowledgment codebook to the size of the hybrid automatic repeat request-acknowledgment codebook; and determining, based at least in part on the comparison, whether the UE failed to detect at least one downlink message from the set of downlink messages.

16. The method of claim 15, further comprising:

determining that the size of the hybrid automatic repeat request-acknowledgment codebook is different from the expected size of the hybrid automatic repeat request-acknowledgment codebook based at least in part on the comparison; and identifying the at least one downlink message the UE failed to detect based at least in part on the determination that the size of the hybrid automatic repeat request-acknowledgment codebook is different from the expected size of the hybrid automatic repeat request-acknowledgment codebook.

17. The method of claim 14, wherein receiving the indication of the size of the hybrid automatic repeat request-acknowledgment codebook comprises:

receiving an indication of a number of information bits in the hybrid automatic repeat request-acknowledgment codebook; or receiving a value that represents the number of information bits in the hybrid automatic repeat request-acknowledgment codebook.

18. The method of claim 14, wherein receiving the indication of the size of the hybrid automatic repeat request-acknowledgment codebook comprises:

receiving the indication of the size of the hybrid automatic repeat request-acknowledgment codebook via a field having a predetermined size, the method further comprising:

decoding the field to obtain the size of the hybrid automatic repeat request-acknowledgment codebook.

19. The method of claim 14, wherein receiving the hybrid automatic repeat request-acknowledgment codebook and the indication of the size of the hybrid automatic repeat request-acknowledgment codebook comprises:

receiving the hybrid automatic repeat request-acknowledgment codebook and the indication of the size of the hybrid automatic repeat request-acknowledgment codebook on a same set of uplink resources.

20. The method of claim 19, wherein the same set of uplink resources comprises a same physical uplink control channel (PUCCH) or a same physical uplink shared channel (PUSCH).

21. The method of claim 14, wherein receiving the hybrid automatic repeat request-acknowledgment codebook and the indication of the size of the hybrid automatic repeat request-acknowledgment codebook comprises:

receiving the hybrid automatic repeat request-acknowledgment codebook on a first set of uplink resources; and receiving the indication of the size of the hybrid automatic repeat request-acknowledgment codebook on a second set of uplink resources.

22. The method of claim 21, further comprising:

receiving the first set of uplink resources before receiving the second set of uplink resources.

23. The method of claim 21, further comprising:

receiving the first set of uplink resources after receiving the second set of uplink resources.

24. The method of claim 21, wherein:

the first set of uplink resources comprises a first physical uplink control channel (PUCCH) or a first physical uplink shared channel (PUSCH); and the second set of uplink resources comprises a second PUCCH or a second PUSCH.

25. The method of claim 14, wherein receiving the hybrid automatic repeat request-acknowledgment codebook and the indication of the size of the hybrid automatic repeat request-acknowledgment codebook comprises:

receiving the hybrid automatic repeat request-acknowledgment codebook on an uplink control channel; and receiving the indication of the size of the hybrid automatic repeat request-acknowledgment codebook via a reference signal pattern associated with the uplink control channel, wherein the reference signal pattern is encoded to convey the size of the hybrid automatic repeat request-acknowledgment codebook.

26. The method of claim 14, wherein the set of downlink messages comprise a physical downlink control channel (PDCCH) having a physical downlink shared channel (PDSCH) allocation, or a PDCCH releasing a semi-persistently scheduled PDSCH, or a semi-persistent PDSCH, or a combination thereof.

27. An apparatus for wireless communication at a user equipment (UE), comprising:
   a processor,
   memory in electronic communication with the processor; and
   instructions stored in the memory and executable by the processor to cause the apparatus to:
      determine, for one or more monitoring occasions, whether a set of downlink messages from a base station have been detected by the UE;
      generate, based at least in part on the determination, a hybrid automatic repeat request-acknowledgment codebook comprising an information bit for each detected downlink message of the set of downlink messages;
      determine a size of the hybrid automatic repeat request-acknowledgment codebook based at least in part on a number of information bits of the hybrid automatic repeat request-acknowledgment codebook; and
      transmit, to the base station, the hybrid automatic repeat request-acknowledgment codebook and an indication of the size of the hybrid automatic repeat request-acknowledgment codebook.

28. The apparatus of claim 27, wherein the instructions to transmit the indication of the size of the hybrid automatic repeat request-acknowledgment codebook are executable by the processor to cause the apparatus to:
   transmit the indication of the size of the hybrid automatic repeat request-acknowledgment codebook using a field having a predetermined size.

29. An apparatus for wireless communication at a base station, comprising:
   a processor,
   memory in electronic communication with the processor; and
   instructions stored in the memory and executable by the processor to cause the apparatus to:
      transmit, to a user equipment (UE), a set of downlink messages during one or more transmission occasions;
      receive, from the UE, a hybrid automatic repeat request-acknowledgment codebook and an indication of a size of the hybrid automatic repeat request-acknowledgment codebook, the hybrid automatic repeat request-acknowledgment codebook comprising respective information bits for at least a subset of the set of downlink messages, wherein the hybrid automatic repeat request-acknowledgment codebook comprises a dynamic codebook based at least in part on a number of detected downlink messages of the set of downlink messages;
      determine the size of the hybrid automatic repeat request-acknowledgment codebook based at least in part on the indication of the size of the hybrid automatic repeat request-acknowledgment codebook; and
      decode the hybrid automatic repeat request-acknowledgment codebook based at least in part on the size of the hybrid automatic repeat request-acknowledgment codebook.

* * * * *